(12) United States Patent
Suga

(10) Patent No.: US 9,519,138 B2
(45) Date of Patent: Dec. 13, 2016

(54) SCANNING LINE ADJUSTER, OPTICAL SCANNER INCORPORATING THE SCANNING LINE ADJUSTER, AND IMAGE FORMING APPARATUS INCORPORATING THE OPTICAL SCANNER

(71) Applicant: Tomoaki Suga, Kanagawa (JP)

(72) Inventor: Tomoaki Suga, Kanagawa (JP)

(73) Assignee: RICOH COMPANY LTD., Tokyo (JP)

( * ) Notice: Subject to any disclaimer, the term of this patent is extended or adjusted under 35 U.S.C. 154(b) by 0 days.

(21) Appl. No.: 15/012,890

(22) Filed: Feb. 2, 2016

(65) Prior Publication Data

US 2016/0231562 A1    Aug. 11, 2016

(30) Foreign Application Priority Data

Feb. 6, 2015    (JP) ................... 2015-022557

(51) Int. Cl.
| | | |
|---|---|---|
| G03G 15/00 | (2006.01) | |
| G02B 26/12 | (2006.01) | |
| H04N 1/04 | (2006.01) | |
| G02B 1/04 | (2006.01) | |
| G03G 15/043 | (2006.01) | |

(52) U.S. Cl.
CPC ............. G02B 26/125 (2013.01); G02B 1/041 (2013.01); G03G 15/043 (2013.01); H04N 1/04 (2013.01)

(58) Field of Classification Search
CPC ......... G02B 26/125; G02B 1/041; H04N 1/04; G03G 15/043
USPC .................................................. 399/4–6, 118
See application file for complete search history.

(56) References Cited

U.S. PATENT DOCUMENTS

| | | | | |
|---|---|---|---|---|
| 5,072,244 A | * | 12/1991 | Aoki ...................... | H04N 1/047 347/116 |
| 2006/0055996 A1 | | 3/2006 | Suga | |
| 2009/0052938 A1 | * | 2/2009 | Sameshima ........ | G03G 21/1676 399/110 |
| 2010/0231684 A1 | | 9/2010 | Suga | |

(Continued)

FOREIGN PATENT DOCUMENTS

| | | |
|---|---|---|
| JP | 2005-134623 | 5/2005 |
| JP | 2006-030705 | 2/2006 |

(Continued)

*Primary Examiner* — Hoang Ngo
(74) *Attorney, Agent, or Firm* — Harness, Dickey & Pierce, P.L.C.

(57) ABSTRACT

A scanning line adjuster, which is incorporated in an optical scanner and an image forming apparatus, includes an optical element, an attitude changer, and an optical element positioner. The optical element is disposed on an optical path extending from a light source to a scanned target object. The optical element has a positioning portion. The attitude changer changes an attitude of the optical element. The optical element positioner contacts the positioning portion to position the optical element. The optical element positioner contacts the positioning portion of the optical element in a direction perpendicular to a moving direction of the positioning portion of the optical element when the attitude changer changes the attitude of the optical element. The optical element positioner includes a contact end to contact the positioning portion. The contact end is made of a different material from the other part of the optical element positioner.

18 Claims, 12 Drawing Sheets

(56) References Cited

U.S. PATENT DOCUMENTS

2013/0021424 A1  1/2013  Suga
2014/0146375 A1  5/2014  Serizawa et al.

FOREIGN PATENT DOCUMENTS

JP   2007-025014   2/2007
JP   2014-106342   6/2014

* cited by examiner

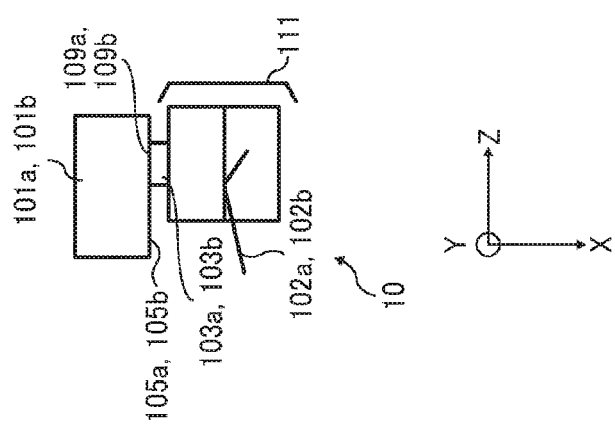
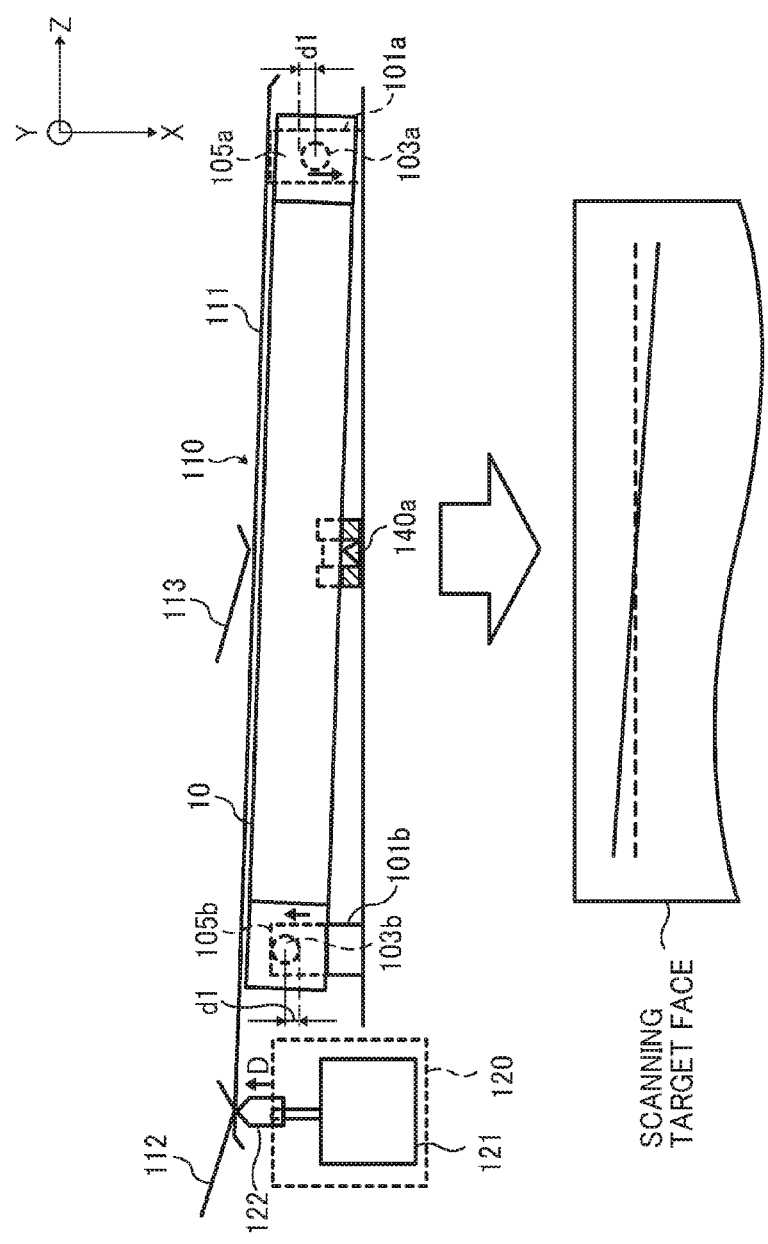

SCANNING LINE ADJUSTER, OPTICAL SCANNER INCORPORATING THE SCANNING LINE ADJUSTER, AND IMAGE FORMING APPARATUS INCORPORATING THE OPTICAL SCANNER

CROSS-REFERENCE TO RELATED APPLICATIONS

This patent application is based on and claims priority pursuant to 35 U.S.C. §119(a) to Japanese Patent Application No. 2015-022557, filed on Feb. 6, 2015, in the Japan Patent Office, the entire disclosure of which is hereby incorporated by reference herein.

BACKGROUND

Technical Field

This disclosure relates to a scanning line adjuster, an optical scanner incorporating the scanning line adjuster, and an image forming apparatus incorporating the optical scanner.

Related Art

Various types of electrophotographic image forming apparatuses include copiers, printers, facsimile machines, or multifunction machines having two or more of copying, printing, scanning, facsimile, plotter, and other capabilities. Such image forming apparatuses usually include an optical scanner for scanning a writing light beam onto a latent image bearer that is a scanned target object. The optical scanner typically includes a polygon mirror to deflect the writing light beam emitted by a light source, and optical elements such as long lens to pass the writing light beam deflected by the polygon mirror and form an image on a surface of the latent image bearer.

Specifically, for example, an optical scanner includes a scanning line adjuster to adjust inclination of a scanning line by adjusting an attitude of a long lens. The scanning line adjuster includes a long lens unit that functions as an optical unit provided with a long lens and a bracket to hold the long lens. The long lens unit is supported by an optical housing and is rotatable along an optical axis orientation around a center in a longitudinal direction of the long lens. The optical housing has a positioning face that functions as a positioning member to contact a longitudinal end of the long lens unit from the optical axis orientation and position the long lens unit along the optical axis orientation. A leaf spring is attached to the optical housing to press the positioning face such that the longitudinal end of the long lens unit faces the positioning face with the long lens unit interposed therebetween. The scanning line adjuster includes an attitude changer that changes an attitude of the long lens unit by pressing the other longitudinal end of the long lens unit in a sub-scanning direction, that is, a direction perpendicular to both the optical axis orientation and a longitudinal direction of the long lens and rotating the long lens unit about the optical axis.

If the scanning line scanned on the surface of the latent image bearer is inclined, the attitude changer presses the other longitudinal end of the long lens unit in the sub-scanning direction to rotate the long lens unit about the optical axis. As the long lens unit rotates, the inclination of the scanning line on the surface of the latent image bearer is corrected.

In the above-described optical scanner, when the attitude of the long lens unit is adjusted by rotating the long lens unit about the optical axis, the one longitudinal end of the long lens unit moves along the positioning face of the optical housing in a direction opposite the direction in which the attitude changer presses the long lens unit. At this time, however, if the static friction generated between the positioning face and the optical housing is large, movement of the one longitudinal end of the long lens unit along the positioning face is hindered by the static friction, and therefore the opposed end side in the longitudinal direction of the long lens moves by a given amount as pressed by the attitude changer. As a result, after completion of inclination adjustment of a scanning line, the long lens unit is curved in a bow shape, and accordingly, it is likely that a scanning line on a surface of the latent image bearer bends.

SUMMARY

At least one aspect of this disclosure provides a scanning line adjuster including an optical element, an attitude changer, and an optical element positioner. The optical element is disposed on an optical path extending from a light source to a scanned target object. The optical element has a positioning portion. The attitude changer changes an attitude of the optical element. The optical element positioner contacts the positioning portion of the optical element and positions the optical element. The optical element positioner contacts the positioning portion of the optical element in a direction perpendicular to a moving direction of the positioning portion of the optical element when the attitude changer changes the attitude of the optical element. The optical element positioner includes a contact end to contact the positioning portion. The contact end is made of a different material from a material of the other part of the optical element positioner.

Further, at least one aspect of this disclosure provides a scanning line adjuster including an optical element, an attitude changer, and an optical element positioner. The optical element is disposed on an optical path extending from a light source to a scanned target object. The optical element has a positioning portion. The attitude changer changes an attitude of the optical element. The optical element positioner contacts the positioning portion of the optical element and positions the optical element. The optical element positioner contacts the positioning portion of the optical element in a direction perpendicular to a moving direction of the positioning portion of the optical element when the attitude changer changes the attitude of the optical element. The positioning portion of the optical element includes a contact end to contact the optical element positioner. The contact end is made of a different material from a material of the other part of the optical element.

Further, at least one aspect of this disclosure provides a scanning line adjuster including an optical element, an attitude changer, an optical element positioner, and a pressing unit. The optical element is disposed on an optical path extending from a light source to a scanned target object. The optical element has a positioning portion. The attitude changer changes an attitude of the optical element. The optical element positioner contacts the positioning portion of the optical element and positions the optical element. The optical element positioner contacts the positioning portion of the optical element in a direction perpendicular to a moving direction of the positioning portion of the optical element when the attitude changer changes the attitude of the optical element. The pressing unit presses the positioning portion of the optical element against the optical element positioner. The pressing unit includes a contact end to contact the optical element. The contact end is made of a different material from a material of the other part of the pressing unit.

Further, at least one aspect of this disclosure provides an optical scanner including a light source and the above-described scanning line adjuster to change an attitude of the optical element disposed on the optical path from the light source to a scanned target object and adjust a scanning line that optically scans the scanned target object.

Further, at least one aspect of this disclosure provides an image forming apparatus including an image bearer, the above-described scanning line adjuster to optically form a latent image on a surface of the image bearer, and a developing device to develop the latent image formed on the surface of the image bearer into a visible image.

BRIEF DESCRIPTION OF THE SEVERAL VIEWS OF THE DRAWINGS

FIG. 14A is a diagram illustrating how inclination adjustment of a scanning line is performed;

FIG. 14B is a different side view illustrating how the inclination adjustment of the scanning line is performed;

DETAILED DESCRIPTION

Figure 1:
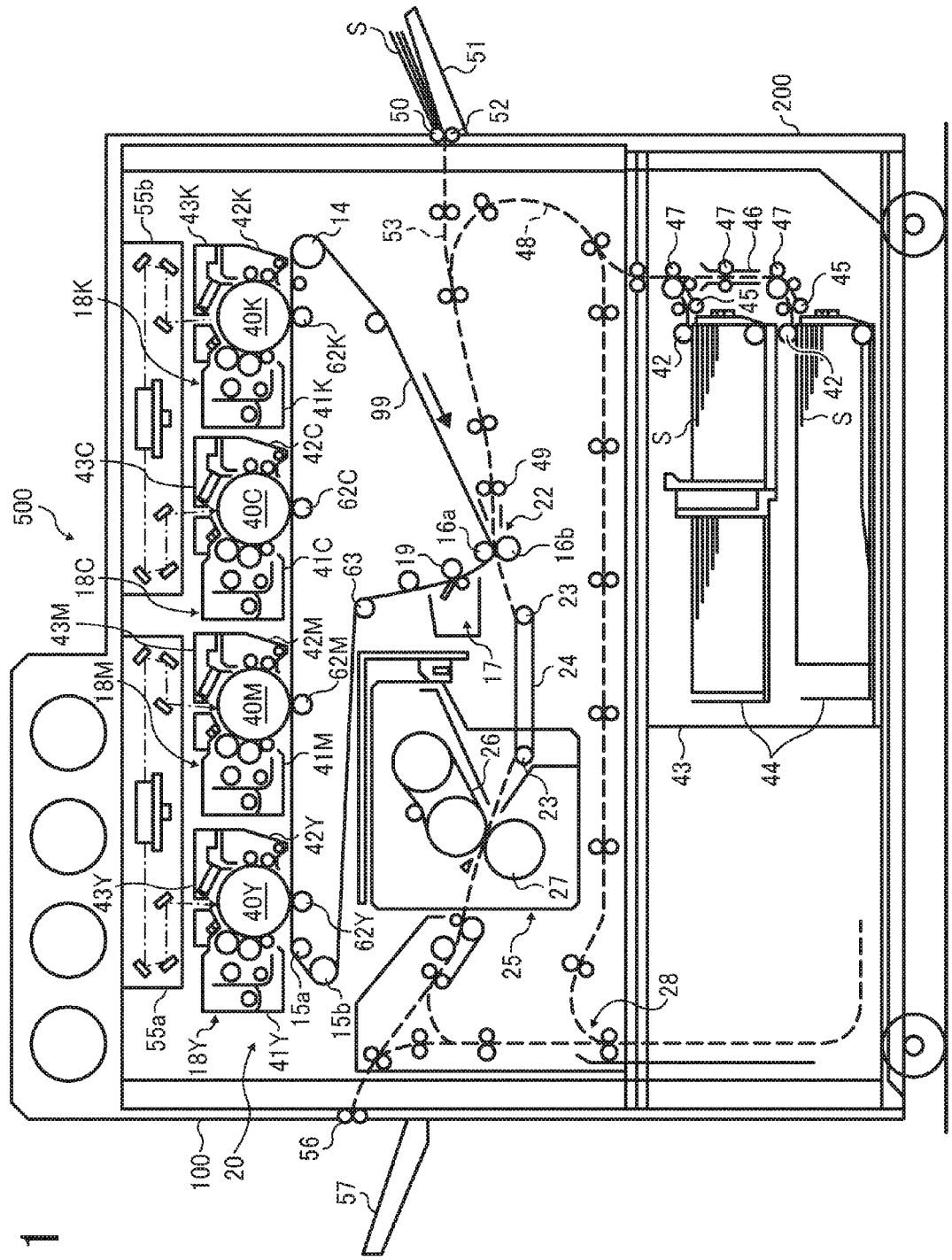
FIG. 1 is a diagram illustrating a schematic configuration of an image forming apparatus according to an example of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

A description is given of an image forming apparatus 500 according to an example of this disclosure.

First, referring to FIG. 1, a description is given of a configuration and functions of the image forming apparatus 500 according to an example of this disclosure, with reference to FIG. 1.

It is to be noted that identical parts are given identical reference numerals and redundant descriptions are summarized or omitted accordingly.

The image forming apparatus 500 may be a copier, a facsimile machine, a printer, a multifunction peripheral or a multifunction printer (MFP) having at least one of copying, printing, scanning, facsimile, and plotter functions, or the like. According to the present example, the image forming apparatus 500 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

FIG. 1 is a schematic diagram illustrating an entire configuration of the image forming apparatus 500 according to the present example. The image forming apparatus 500 is an electrophotographic image forming apparatus of a tandem and intermediate transfer type. The image forming apparatus 500 includes an apparatus body 100 and a sheet feeding unit 200 on which the apparatus body 100 is mounted. It is to be noted that suffixes "Y", "M", "C", and "K" represent respective colors of yellow, cyan, magenta, and black.

The apparatus body 100 includes an intermediate transfer belt 99 of an endless belt type at the center. The intermediate transfer belt 99 is wound around multiple support rollers and rotates in a clockwise direction.

A belt cleaning device 17 is disposed on a left side of a support roller 19 in FIG. 1. The belt cleaning device 17 removes residual toner remaining on a surface of the intermediate transfer belt 99 after an image formed on the surface of the intermediate transfer belt 99 is transferred.

A tandem image forming device 20 includes four image forming units 18Y, 18M, 18C, and 18K aligned along a belt moving direction on and over the intermediate transfer belt 99 stretched between a support roller 14 and a support roller 15a.

Hereinafter, the units and components included in the image forming apparatus 500 are occasionally referred to in a singular form collectively, such as the image forming unit 18.

As illustrated in FIG. 1, a first writing device 55a and a second writing device 55b are aligned above the tandem image forming device 20. The first writing device 55a that functions as an optical scanner emits scanning light beams to photoconductors 40Y and 40M to form respective latent images. By contrast, the second writing device 55b that also functions as an optical scanner emits scanning light beams to photoconductors 40C and 40K to form respective latent images.

The image forming units 18Y, 18M, 18C, and 18K of the tandem image forming device 20 include the drum-shaped photoconductors 40Y, 40M, 40C, and 40K, respectively. The image forming units 18Y, 18M, 18C, and 18K function image bearers to bear respective color toner images.

The image forming unit 18 (i.e., the image forming units 18Y, 18M, 18C, and 18K) further includes a charging device 43 (i.e., charging devices 43Y, 43M, 43C, and 43K), a developing device 41 (i.e., developing devices 41Y, 41M, 41C, and 41K), and a photoconductor cleaning device 42 (i.e., photoconductor cleaning devices 42Y, 42M, 42C, and 42K). The charging device 43 uniformly charges the surface of the photoconductor 40 (i.e., the photoconductors 40Y, 40M, 40C, and 40K). The developing device 41 develops a latent image formed on the surface of the photoconductor 40 by the first writing device 55a and the second writing device 55b. The photoconductor cleaning device 42 cleans the surface of the photoconductor 40 after the latent image is transferred onto the surface of the intermediate transfer belt 99.

Further, primary transfer rollers 62Y, 62M, 62C, and 62K are disposed at a primary transfer position where the toner image is transferred from the photoconductors 40Y, 40M, 40C, and 40K onto the intermediate transfer belt 99. At the primary transfer position, the primary transfer rollers 62Y, 62M, 62C, and 62K are disposed facing the photoconductors 40Y, 40M, 40C, and 40K, respectively, with the intermediate transfer belt 99 interposed therebetween.

The support roller 14 is a driving roller to drive and rotate the intermediate transfer belt 99. When a black toner image is formed on the intermediate transfer belt 99, the support roller 15*a* and a support roller 15*b*, both of which are driven rollers, may be moved to separate the photoconductors 40Y, 40M, 40C, and 40K from the intermediate transfer belt 99.

The apparatus body 100 includes a secondary transfer device 22 at an opposite side of the tandem image forming device 20 across the intermediate transfer belt 99. The secondary transfer device 22 forms a secondary transfer nip region by pressing a secondary transfer roller 16*a* against a secondary transfer opposing roller 16*b* in the configuration illustrated in FIG. 1. By applying a transfer electric field to the secondary transfer roller 16*a* and the secondary transfer opposing roller 16*b*, the toner image formed on the surface of the intermediate transfer belt 99 is transferred onto a sheet S that functions as a transfer sheet.

Further, a fixing device 25 is disposed next to (in FIG. 1, on a left side of) the secondary transfer device 22. The fixing device 25 fixes the toner image formed on the sheet S to the sheet S. A sheet conveying belt 24 is disposed between the secondary transfer device 22 and the fixing device 25 and wound around belt supporting rollers 23. The sheet conveying belt 24 conveys the sheet S that has received the toner image from the intermediate transfer belt 99 by the secondary transfer device 22 to the fixing device 25. The fixing device 25 includes a fixing belt 26 and a pressure roller 27. The pressure roller 27 presses the fixing belt 26 that is an endless belt. After the toner image is transferred onto the sheet S, the sheet conveying belt 24 conveys the sheet S to the fixing device 25.

It is to be noted that the image forming apparatus 500 illustrated in FIG. 1 further includes a sheet reversing device 28 below the secondary transfer device 22 and the fixing device 25 and parallel to the tandem image forming device 20. The sheet reversing device 28 reverses the sheet S when performing duplex printing on both sides of the sheet S.

On transmission of image data to the image forming apparatus 500 and receipt of a single to start image formation, a driving motor provided to the image forming apparatus 500 causes a driving motor to rotate the support roller 14. Accordingly, the other multiple support rollers rotate in response to rotation of the support roller 14, the intermediate transfer belt 99 rotates endlessly. At the same time, the writing devices 55*a* and 55*b* start forming respective latent images on the respective photoconductors 40Y, 40M, 40C, and 40K of the image forming units 18Y, 18M, 18C, and 18K.

Then, the developing devices 41Y, 41M, 41C, and 41K of the image forming units 18Y, 18M, 18C, and 18K develop the respective latent images into visible single color toner images of yellow, magenta, cyan, and black. Along with endless movement of the intermediate transfer belt 99, the respective visible single toner images are conveyed to respective primary transfer nip regions formed between the photoconductors 40Y, 40M, 40C, and 40K and the primary transfer rollers 62Y, 62M, 62C, and 62K, respectively. In the respective transfer nip regions, the respective single color toner images are sequentially transferred onto the surface of the intermediate transfer belt 99 to form a composite color toner image on the surface of the intermediate transfer belt 99.

The image forming apparatus 500 further includes multiple sheet trays 44 provided to a sheet bank 43 in a sheet feed unit 200. Each of the multiple sheet trays 44 has a sheet roller 42. A selected one of the sheet rollers 42 rotates to feed the sheet S from the sheet tray 44 having the selected sheet roller 42. The sheet S fed from the selected sheet tray 44 is separated by a separation roller 45 one by one and is conveyed to a sheet feeding path 46. Then, the sheet S is conveyed by a sheet conveying roller 47 to an apparatus side sheet conveying path 48 in the apparatus body 100 until the sheet S abuts against a pair of registration rollers 49 to stop.

Alternatively, a bypass sheet feed roller 50 rotates to feed a sheet S placed on a bypass tray 51. The fed sheet S is separated by a bypass separation roller 52 one by one to be conveyed to a bypass sheet feeding path 53 until the sheet S abuts against the pair of registration rollers 49 to stop.

The pair of registration rollers 49 rotates in synchronization with movement of the color toner image formed on the surface of the intermediate transfer belt 99, so that the sheet S is conveyed to an image transfer position between the secondary transfer roller 16*b* of the secondary transfer device 22 and the intermediate transfer belt 99. The color toner image formed on the intermediate transfer belt 99 is transferred onto the sheet S.

The sheet S after the secondary image transfer is then conveyed by the sheet conveying belt 24 to the fixing device 25. In the fixing device 25, the color toner image on the sheet S is fixed to the sheet S by application of heat and pressure. Thereafter, a sheet discharging roller 56 rotates to convey the sheet S to an outside of the image forming apparatus 500. The sheet S is then stacked on a sheet discharging tray 57.

In duplex printing, a switching claw moves to switch a direction of passage of the sheet S after the fixing device 25 to a sheet reversing device 28 where the sheet S is reversed and guided to the image transfer position again. Then, a color toner image is formed on the rear side of the sheet S and then discharged by the sheet discharging roller 56 to be discharged to the sheet discharging tray 57

The intermediate transfer belt 99 has residual toner remaining on the surface thereof after the secondary image transfer. The belt cleaning device 17 removes the residual toner form the surface of the intermediate transfer belt 99 to clean the intermediate transfer belt 99 for a subsequent image formation.

Next, a description is given of the first writing device 55*a* and the second writing device 55*b*, each functioning as an optical scanner.

Since the first writing device 55*a* and the second writing device 55*b* basically have an identical configuration to each other, the description below is given based on a configuration of the writing device 55*a*, except for the toner colors. Therefore, the units and functions of the configuration of the first writing device 55*a* described below are also applied to the units and functions of the configuration of the second writing device 55*b*.

Figure 2:
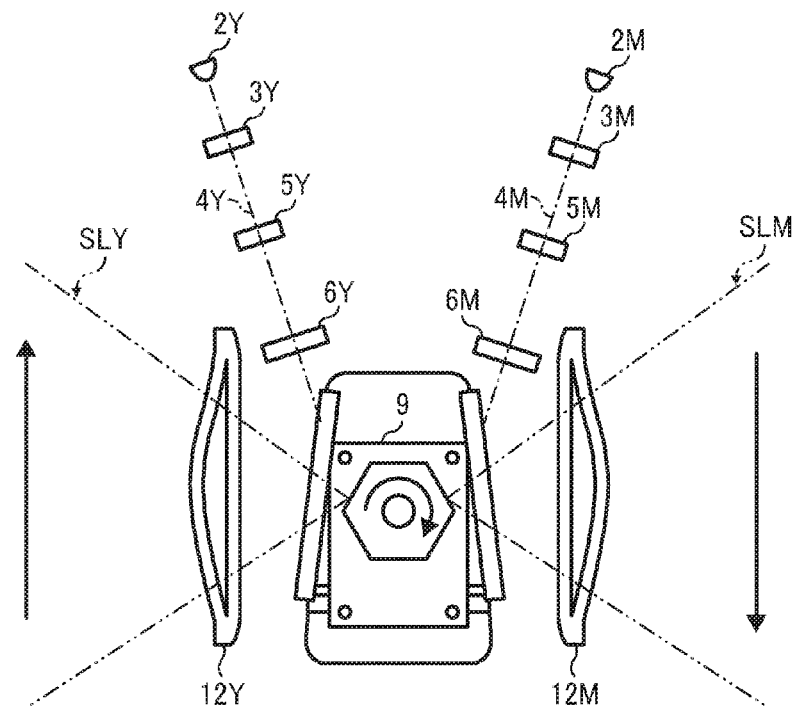
FIG. 2 is a plane view illustrating a writing device according to the present example of this disclosure.
Figure 3:
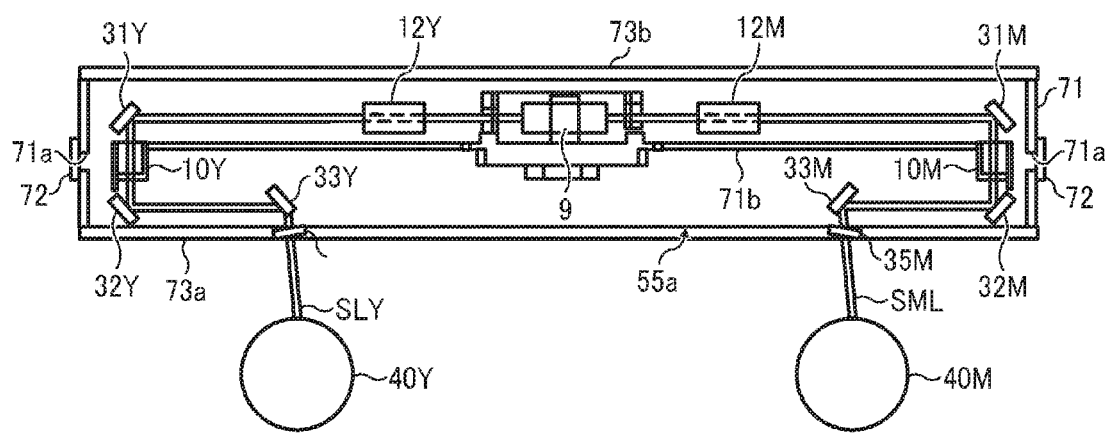
FIG. 3 is a side cross sectional view illustrating the writing device.

FIG. 2 is a plane view illustrating the first writing device 55*a*, viewed from top. FIG. 3 is a side cross sectional view illustrating the first writing device 55*a*.

As illustrated in FIGS. 1 and 2, the first writing device 55*a* emits scanning beams SLY and SLM to the photoconductors 40Y and 40M, respectively. It is to be noted that the scanning beams SLY and SLM are occasionally referred to in a singular form such as the scanning beam SL.

Further, the first writing device 55*a* includes a polygon mirror 9 that functions as a deflecting unit. The first writing device 55*a* is an opposed type optical scanner having a configuration in which a group of optical units for forming a yellow toner image and a group of optical units form forming a magenta toner image are disposed linearly symmetrical with a symmetrical line that passes the center of rotation of the polygon mirror 9 and drawn in a direction perpendicular to an axial direction of a rotary shaft of the polygon mirror 9.

The first writing device 55a includes an optical housing 71 that accommodates light sources 2Y and 2M, collimator lenses 3Y and 3M, apertures 5Y and 5M, cylindrical lenses 6Y and 6M, the polygon mirror 9, f-θ (f-theta) lenses 12Y and 12M, upper mirrors 31Y and 31M, long lenses 10Y and 10M, first lower mirrors 32Y and 32M, and second lower mirrors 33Y and 33M.

The optical housing 71 includes a partition 71b to vertically separate to an upper room and a lower room. A top face and a bottom face of the optical housing 71 are open. The top face of the optical housing 71 is covered by an upper cover 73b and the bottom face of the optical housing 71 is covered by a lower cover 73a. The upper room above the partition 71b of the optical housing 71 accommodates the light sources 2Y and 2M, the collimator lenses 3Y and 3M, the apertures 5Y and 5M, the cylindrical lenses 6Y and 6M, the polygon mirror 9, the f-θ lenses 12Y and 12M, and the upper mirrors 31Y and 31M. The lower room below the partition 71b of the optical housing 71 accommodates the long lenses 10Y and 10M, the first lower mirrors 32Y and 32M, and the second lower mirrors 33Y and 33M.

The light source 2Y emits a scanning beam SLY that forms a scanning line to the photoconductor 40Y that functions as a scanned target object for forming a yellow color image. The light source 2M emits a scanning beam SLM that forms a scanning line to the photoconductor 40M that functions as a scanning target for forming a magenta color image.

A main light beam 4Y emitted by the light source 2Y passes through the collimator lens 3Y and the aperture 5Y and transmits the cylindrical lens 6Y to incident to the polygon mirror 9. Similarly, a main light beam 4M emitted by the light source 2M passes through the collimator lens 3M and the aperture 5M and transmits the cylindrical lens 6M to incident to the polygon mirror 9.

The polygon mirror 9 is rotated by a polygon motor. The main light beam 4Y used for yellow color image formation incidents to the polygon mirror 9 to be reflected by the polygon mirror 9, and then turns to the scanning beam SLY. As illustrated in FIG. 3, the scanning beam SLY transmits through the f-θ lens 12Y, is reflected by the upper mirror 31Y, passed the opening of the partition 71b, and incidents to the long lens 10Y. The scanning beam SLY is then collected in the sub-scanning direction, is reflected by the first lower mirror 32Y, and incidents to the second lower mirror 33Y. Then, the scanning beam SLY is reflected by the second lower mirror 33Y, and passes a dust-proof glass 35Y. The dust-proof glass 35Y is disposed to block a light emission opening through which the scanning beam SLY passes, so as to prevent dust from entering from the light emission opening into the optical housing 71. After passing through the dust-proof glass 35Y, the scanning beam SLY incidents to the photoconductor 40Y. On arrival of the scanning beam SLY emitted from the first writing device 55a to the surface of the photoconductor 40Y, the scanning beam SLY starts to form a yellow latent image.

Similarly, the main light beam 4M used for magenta color image formation incidents to the polygon mirror 9 to be reflected by the polygon mirror 9, and then turns to the scanning beam SLM. As illustrated in FIG. 3, the scanning beam SLM transmits through the f-θ lens 12M, is reflected by the upper mirror 31M, and incidents to the long lens 10M. Then, the scanning beam SLM is reflected by the first lower mirror 32M and the second lower mirror 33M, and passes through a dust-proof glass 35M and incidents to the photoconductor 40M to start forming a magenta latent image.

An opening 71a to access an adjusting screw is disposed on a side surface facing the long lens 10Y and 10M of the optical housing 71. The opening 71a is covered and closed by a seal 72.

The optical housing 71 of the present example is made of aluminum die-cast. By manufacturing the optical housing 71 by aluminum die-cast having high heat conductivity, heat dispassion efficiency in the optical housing 71 can be enhanced.

The polygon motor to drive and rotate the polygon mirror 9 and a control board to control the polygon mirror 9 are disposed in the optical housing 71. When deflect a main light beam such as the main light beams 4Y and 4M, the polygon mirror 9 is rotated at high speed, and therefore the polygon mirror 9 generates heat. Further, when the polygon mirror 9 is driving, electronic control components disposed on the control board also generate heat. The heat generation increases the temperature of heat in the optical housing 71, and therefore it is likely that the lens provided in the optical housing 71 deforms due to thermal expansion. Consequently, it becomes difficult to obtain desired optical properties.

However, by manufacturing the optical housing 71 by aluminum, heat generated by the polygon mirror 9 and the control board in the optical housing 71 can be dissipated to the outside of the optical housing 71 efficiently, thereby restraining an increase in temperature in the optical housing 71.

Next, a description is given of a configuration of a scanning line adjuster 300 to adjust inclination and bend of a scanning line of the long lens 10 caused by the writing devices 55a and 55b.

Inclination of a scanning line can be adjusted by changing the attitude of a long lens unit that includes the long lens 10 and a bracket supporting the long lens 10. It is to be noted that the scanning line adjuster to adjust inclination of a scanning line by changing the attitude of the long lens unit has an identical configuration to each color. Therefore, suffixes to identify respective colors are omitted in the following description. It is also to be noted that an optical axis orientation is represented as a Y direction, the main scanning direction is represented as a Z direction, and the sub-scanning direction is represented as an X direction.

Figure 4:
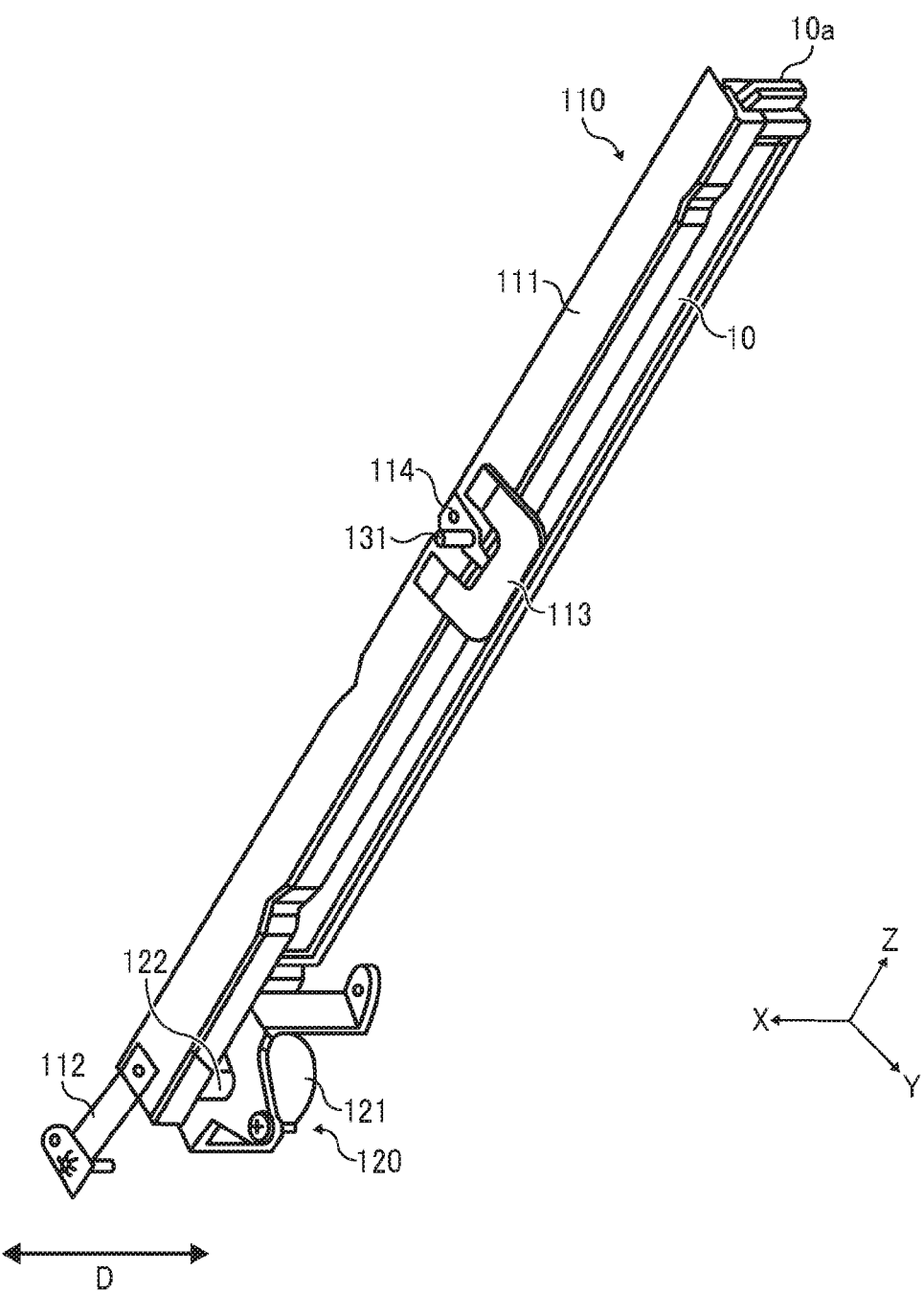
FIG. 4 is a perspective view illustrating a long lens unit, viewed from obliquely downward.
Figure 5:
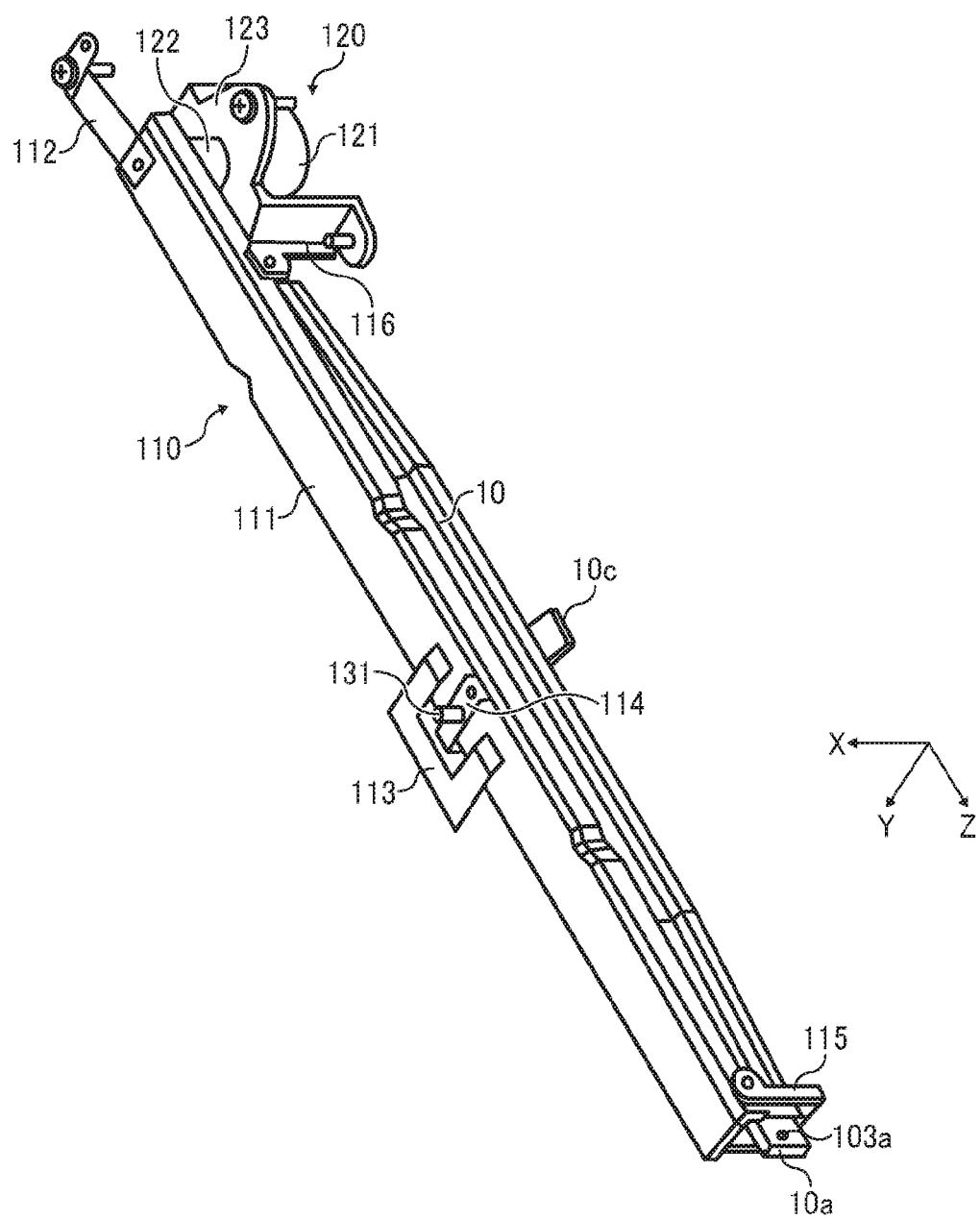
FIG. 5 is a perspective view of the long lens unit, viewed from obliquely upward.
Figure 6:
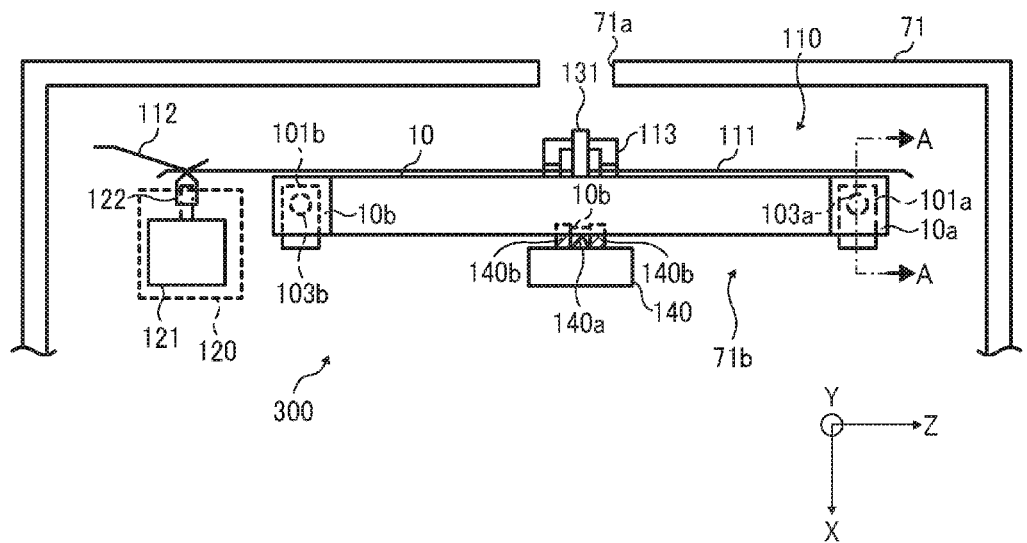
FIG. 6 is a perspective view illustrating a long lens unit, viewed from downward.

FIG. 4 is a perspective view illustrating a long lens unit 110, viewed from obliquely downward. FIG. 5 is a perspective view of the long lens unit 110, viewed from obliquely upward. FIG. 6 is a perspective view illustrating the long lens unit 110, viewed from downward.

The long lens unit 110 includes the long lens 10 and a bracket 111. The long lens 10 has power to correct an optical face tangle error of the polygon mirror 9 in the sub-scanning direction (the X direction in FIGS. 4 through 6). The bracket 111 supports the long lens 10.

Lens fixing leaf springs 115 and 116 are provided to the bracket 111 at respective positions corresponding to both ends of the long lens 10 to fix the long lens 10 to the bracket 111.

The bracket 111 has a screw hole at a position corresponding to the center in the longitudinal direction, i.e., the main scanning direction of the long lens 10. A bend adjusting screw 131 is screwed to the screw hole of the bracket 111.

A bend adjusting leaf spring 114 is attached a position of the bracket 111 corresponding to the center in the longitudinal direction of the long lens 10 to bias the long lens 10 toward the bend adjusting screw 131.

An inclination adjusting device 120 that functions as an attitude changer is disposed at a longitudinal end of the long lens unit 110.

The long lens unit 110 further includes an inclination adjusting leaf spring 112 and a unit supporting leaf spring 113. The inclination adjusting leaf spring 112 is disposed facing the inclination adjusting device 120 with the bracket 111 interposed therebetween. The inclination adjusting leaf spring 112 biases the long lens unit 110 to the inclination adjusting device 120. The unit supporting leaf spring 113 is disposed holding the bend adjusting screw 131, which is screwed to the bracket 111, from both sides of the bend adjusting screw 131. The unit supporting leaf spring 113 biases the long lens unit 110 to a support 140a (see FIG. 6).

As illustrated in FIG. 6, a setting table 140 is disposed on a lower face of the partition 71b of the optical housing 71. The setting table 140 positions the long lens unit 110 in the main scanning direction, i.e., the Z direction. In addition, the setting table 140 holds the long lens unit 110 rotatably about an optical axis, i.e., the Y axis in the present example.

The setting table 140 includes the support 140a and a pair of positioning projections 140b. The support 140a is disposed projecting from the setting table 140 in the sub-scanning direction (the X direction). The pair of positioning projections 140b is disposed with the support 140a therebetween and projecting from the setting table 140 in the sub-scanning direction (the X direction).

As illustrated in FIG. 5, a positioning target projection 10c is disposed at the center in the longitudinal direction of the long lens 10 projecting to an upstream side in a light traveling direction. As illustrated in FIG. 6, the positioning target projection 10c is inserted between the pair of positioning projections 140b mounted on the setting table 140 and, at the same time, the center in the longitudinal direction of the long lens 10 is caused to contact the support 140a. Further, the long lens unit 110 is pressed by the unit supporting leaf spring 113 against the support 140a. By so doing, the long lens unit 110 is supported by the setting table 140 so as to rotate about the support 140a in the optical axis orientation in a given range.

Figure 7:
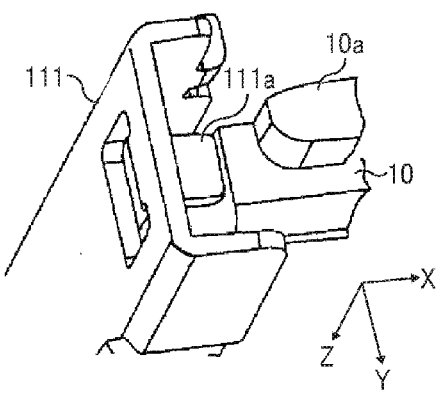
FIG. 7 is an enlarged perspective view illustrating a bracket near a free end thereof.
Figure 8:
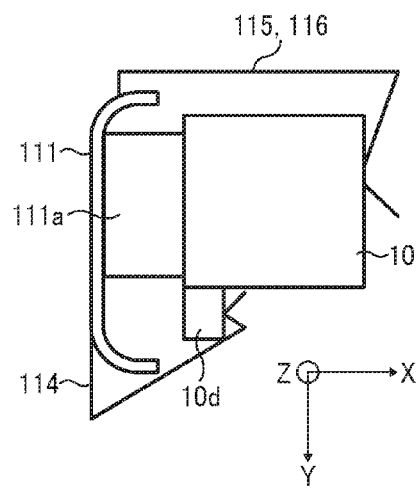
FIG. 8 is a diagram of how a long lens is attached to the bracket.

FIG. 7 is an enlarged perspective view illustrating the long lens unit 110 near a free end thereof located opposite to the motor, where the inclination adjusting device 120 is disposed. FIG. 8 is a diagram of how the long lens 10 is attached to the bracket 111.

As illustrated in FIG. 7, a lens receiving portion 111a is provided near the free end of the bracket 111. The lens receiving portion 111a is bent to the long lens 10. Another lens receiving portion 111a that has the same configuration as the lens receiving portion 111a as illustrated in FIG. 7 is provided at a position on the bracket 111 corresponding to an end of the long lens 10 on the side of the driving motor 121. The lens fixing leaf springs 115 and 116 disposed on the bracket 111 at respective positions corresponding to both ends of the long lens 10 as illustrated in FIG. 5 contact a side of the long lens 10 opposite to a side thereof facing the bracket 111 to bias the long lens 10 to the bracket 111 as illustrated in FIG. 8. Due to biasing forces of the lens fixing leaf springs 115 and 116, the long lens 10 is pressed to the lens receiving portion 111a and fixed to the bracket 111.

A spring holder 10d is disposed at the center in the longitudinal direction of the long lens 10 projecting to a downstream side in the light traveling direction. The bend adjusting leaf spring 114 that is attached to the bracket 111 at the position corresponding to the center in the longitudinal direction of the long lens 10, as illustrated in FIG. 5, contacts the spring holder 10d from the opposite side to the bracket 111. Accordingly, the center in the longitudinal direction of the long lens 10 is biased by the bend adjusting leaf spring 114 toward the bend adjusting screw 131 to be pressed to the bend adjusting screw 131.

Figure 9:
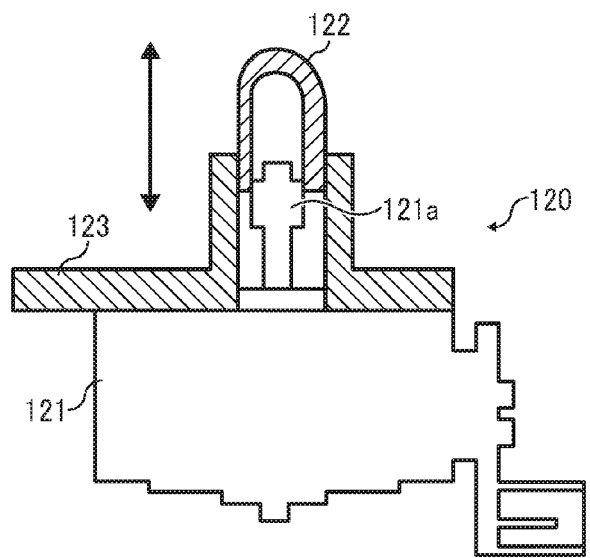
FIG. 9 is a cross sectional view illustrating an inclination adjusting device.

FIG. 9 is a cross sectional view illustrating the inclination adjusting device 120.

The inclination adjusting device 120 includes a driving motor 121, an adjuster 122, and a driving motor holder 123. A thread 121a is mounted on an output shaft of the driving motor 121. The adjuster 122 is screwed to the thread 121a. The adjuster 122 is a D shape in cross section and is inserted into an adjuster insertion opening that has a D shape and is provided to the driving motor holder 123. By so doing, the adjuster 122 is restricted by the adjuster insertion opening. Therefore, even if the output shaft of the driving motor 121 rotates, the adjuster 122 does not rotate and can be move in a vertical direction by screw feed performed by the output shaft of the driving motor 121.

Figure 10:
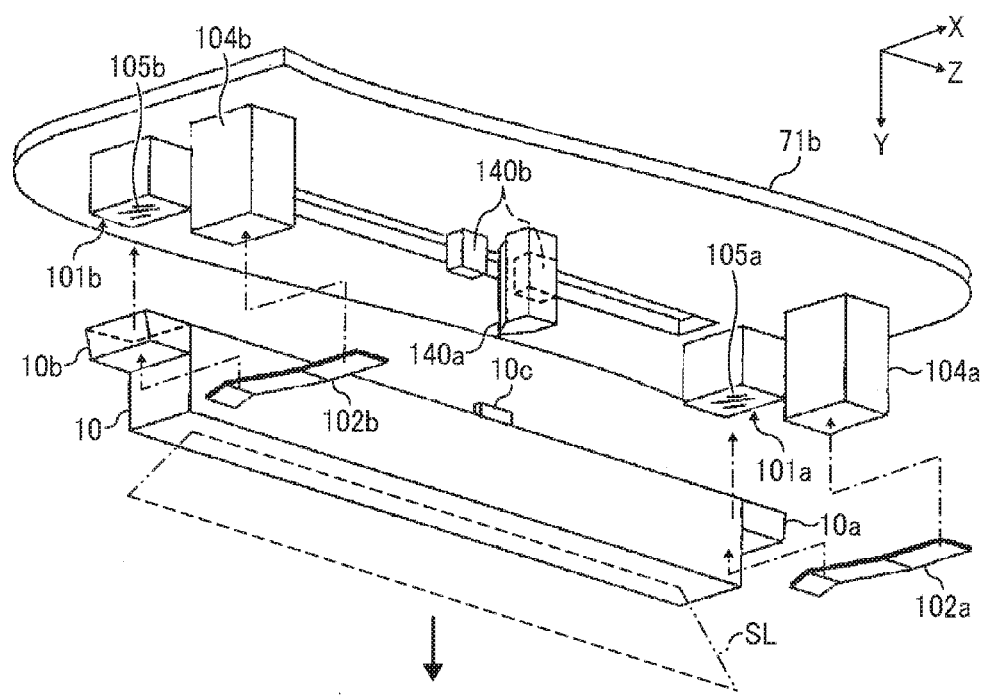
FIG. 10 is an exploded perspective view illustrating a positioning device for positioning the long lens unit in an optical axis orientation.
Figure 11:
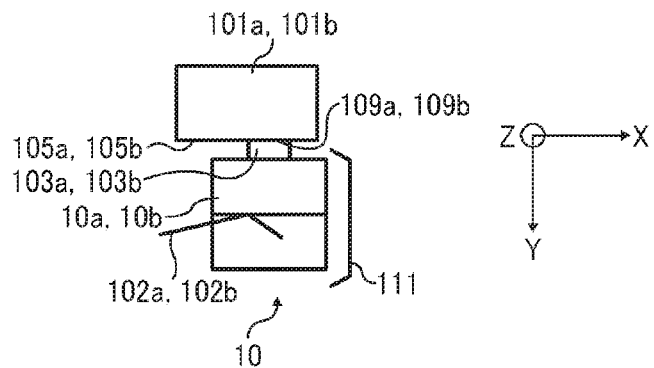
FIG. 11 is a cross sectional view of the long lens unit along a line of A-A of FIG. 6.

FIG. 10 is an exploded perspective view illustrating a positioning device for positioning the long lens unit 110 in the optical axis orientation. FIG. 11 is a cross sectional view of the long lens unit 110 along a line of A-A of FIG. 6.

As illustrated in FIG. 10, planar portions 10a and 10b at both ends in the main scanning direction of the long lens 10. Unit positioning bases 101a and 101b are disposed on the lower face of the partition 71b of the optical housing 71 at positions with respect to the planar portions 10a and 10b, respectively. The unit positioning bases 101a and 101b include positioning faces 105a and 105b, respectively. Spring fixing bases 104a and 104b are disposed on the lower face of the partition of the optical housing 71. Positioning leaf springs 102a and 102b are fixed to the spring fixing bases 104a and 104b, respectively. The positioning leaf springs 102a and 102b bias the planar portions 10a and 10b to the unit positioning bases 101a and 101b, respectively. The positioning leaf springs 102a and 102b are screwed to the spring fixing bases 104a and 104b.

As illustrated in FIGS. 6 and 11, positioning projections 103a and 103b are mounted on surfaces facing the unit positioning base 101a of the planar portion 10a and the unit positioning base 101b of the planar portion 10b, respectively. The positioning projections 103a and 103b includes leading end faces 109a and 109b, respectively. The positioning leaf springs 102a and 102b contact the planar portions 10a and 10b of the long lens 10 to the unit positioning bases 101a and 101b, respectively. By so doing, the leading end face 109a of the positioning projection 103a and the leading end face 109b of the positioning projection 103b are pressed against the positioning face 105a of the unit positioning base 101a and the positioning face 105b of the unit positioning base 101b, respectively. Eventually, the long lens unit 110 is positioned to direct to the optical axis orientation.

Now, a description is given of how the scanning line adjuster 300 performs bending adjustment of a scanning line.

The bending adjustment of a scanning line is performed at the time of factory shipment of the image forming apparatus 500. Detailed bending adjustment of a scanning line is described as follows. At adjustment of bending of a scanning line, a user inserts a tool such as a screw driver from the opening 71a on the side surface of the optical housing 71, as illustrated in FIG. 6, to access the bend adjusting screw 131.

Figure 12:
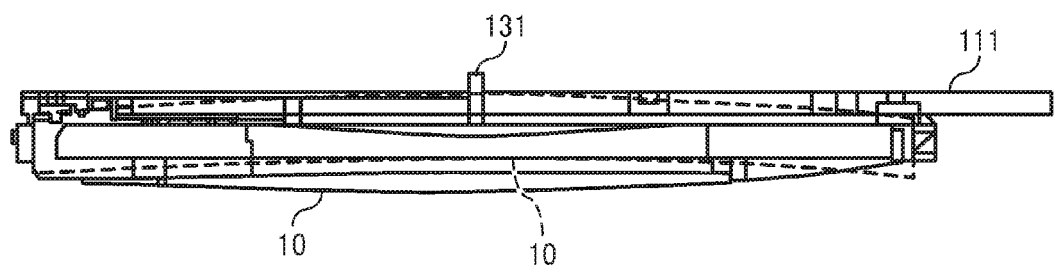
FIG. 12 is a diagram illustrating bending adjustment of a scanning line.
Figure 13:
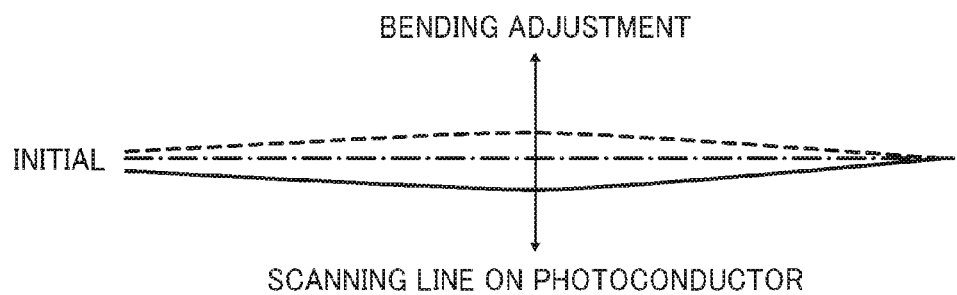
FIG. 13 is a diagram illustrating the scanning line on a photoconductor in bending adjustment.

In an initial state in which the bend adjusting screw 131 is not attached, the long lens 10 is warped due to a biasing force generated by the bend adjusting leaf spring 114 as illustrated with a dotted line in FIG. 12, with the center located toward the bracket 111. Therefore, in the initial state, the scanning line runs as illustrated with a dotted line in FIG. 13. As the user screws the tool such as a screw driver to fix the bend adjusting screw 131 from the initial state, the bend adjusting screw 131 presses the center in the longitudinal direction of the long lens 10 in a direction separating from the bracket 111 against the biasing force of the bend adjusting leaf spring 114. Both longitudinal ends of the long lens 10 are fixed by the lens fixing leaf springs 115 and 116 and the rigidity of the long lens 10 is lower than the rigidity of the bracket 111. Therefore, by screwing the bend adjusting screw 131, the long lens 10 is changed from a curved shape to a straight shape. According to a warped amount of the long lens 10, the degree of bending of a scanning line by a laser beam that passes through the long lens 10 changes. Therefore, by adjusting the tightening amount of the bend adjusting screw 131, the bending of the scanning line generated in the initial state is corrected. After completion of bending adjustment, the user pulls out the tool from the opening 71a (see FIG. 6) of the optical housing 71 and covers the opening 71a with a seal 72 (see FIG. 3).

Next, a description is given of inclination adjustment of a scanning line according to the present example of this disclosure.

Inclination adjustment of a scanning line is performed at the time of factory shipment of the image forming apparatus 500. In addition, any given timing at operation of the image forming apparatus 500, for example, a timing in which the number of printed sheets has reached a given number and a timing in which a request of inclination adjustment is issued by a user. Detailed inclination adjustment of a scanning line is described as follows. First, in the same operation as a regular image forming operation to form images on the photoconductors 40Y, 40M, 40C, and 40K, a latent image of a predetermined pattern for inclination adjustment is formed. Then, in the same operation as the regular image forming operation, the latent image of the predetermined pattern for inclination adjustment is developed into an inclination adjustment pattern (a toner image) to be transferred onto the intermediate transfer belt 99. Thereafter, the inclination adjustment pattern transferred onto the intermediate transfer belt 99 is detected by a pattern sensor (an optical sensor). Based on the detection results obtained by the pattern sensor, the inclination of each scanning line is grasped to calculate the amount of inclination of the grasped scanning line. The result is output to an inclination controller. Based on the calculation result, the inclination controller controls an angle of rotation of the driving motor 121. As a result, the adjuster 122 attached to a rotary shaft of the driving motor 121 is elevated and the end of the long lens unit 110 on the side of the driving motor 121 moves in a direction indicated by arrow D in FIG. 14A. Specifically, as the adjuster 122 ascends, the end of the long lens unit 110 on the side of the driving motor 121 rises against the biasing force of the inclination adjusting leaf spring 112. By so doing, the long lens unit 110 rotates in the clockwise direction about the support 140a in FIG. 14A to change the attitude. By contrast, as the adjuster 122 descends, the end of the long lens unit 110 on the side of the driving motor 121 is lowered by the biasing force of the inclination adjusting leaf spring 112. By so doing, the long lens unit 110 rotates in a counterclockwise direction about the support 140a in FIG. 14A to change the attitude.

As the attitude of the long lens unit 110 changes, an attitude or a position at which the scanning beam SL (e.g., the scanning beam SLY and the scanning beam SLM) incident to an incident face of the long lens 10 changes. The long lens 10 is an optical element that has power to be exerted in the sub-scanning direction. As the attitude of incident of a scanning beam with respect to the incident face of the long lens 10 changes to the sub-scanning direction, an angle (an output angle) in the sub-scanning direction of the scanning beam emitted from the light output face of the long lens 10 changes. Consequently, when the adjuster 122 changes the attitude of the long lens unit 110, the output angle of the laser beam incident from the output face of the long lens 10 changes, accordingly. As a result, inclination of the scanning line on the photoconductor 40 is corrected.

Next, a description is given of operations of the inclination adjustment of a scanning line according to the present example of this disclosure.

As illustrated in FIG. 14, in the inclination adjustment of a scanning line, as the inclination adjusting device 120 presses the end of the long lens unit 110 on the side of the driving motor 121 in a direction indicated by arrow D illustrated in FIG. 14, the long lens unit 110 rotates about the support 140a in the clockwise direction. Consequently, the positioning projection 103b on the side of the driving motor 121 (hereinafter, the "motor side") moves on the positioning face 105b of the unit positioning base 101b on the motor side by a distance dl in a direction indicated by arrow in FIG. 14, which is the same direction as the pressing direction D of the inclination adjusting device 120. By contrast, the positioning projection 103a on the side of the free end of the long lens 10 (hereinafter, the "free end side") moves on the positioning face 105a of the unit positioning base 101a on the free end side by the distance dl in an opposite direction to the arrow in FIG. 14, which is the opposite direction to the pressing direction D of the inclination adjusting device 120.

Figure 15A:
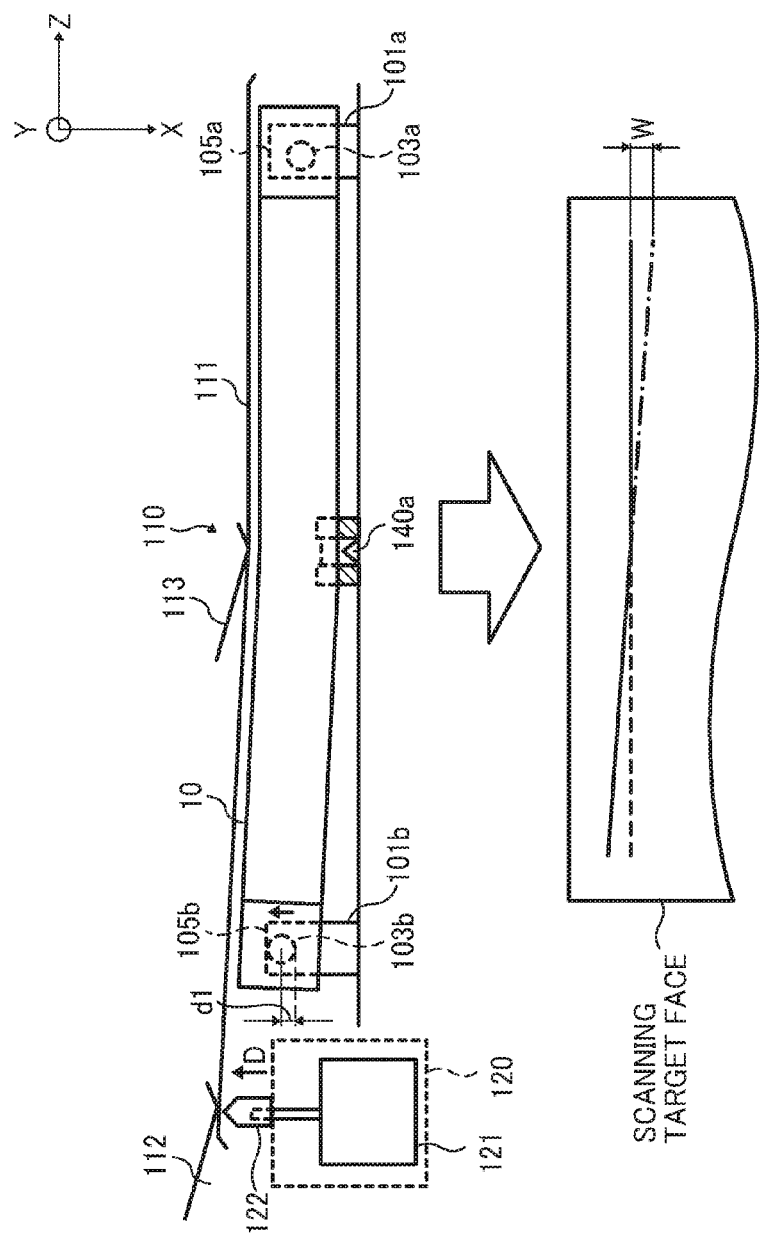
FIG. 15A is a side view illustrating how a scanning line curved on the photoconductor is adjusted.
Figure 15B:
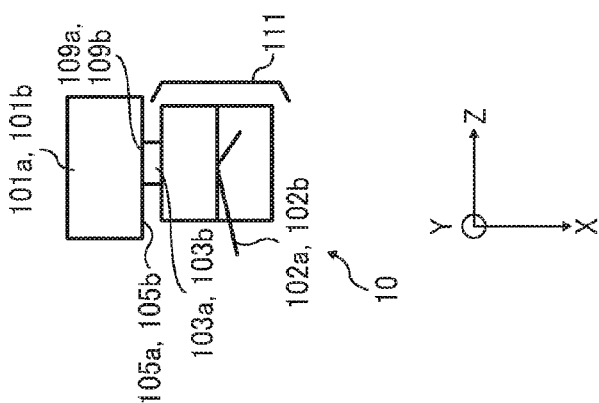
FIG. 15B is a different side view how the scanning line curved on the photoconductor is adjusted.

However, in a case in which a static friction generated between the positioning face 105a of the unit positioning base 101a and the positioning projection 103a on the free end side is relatively large, when the end of the long lens unit 110 on the motor side is pressed by the inclination adjusting device 120 as illustrated in FIG. 15, the positioning face 105a of the unit positioning base 101a on the motor side does not move on the positioning face 105a of the unit positioning base 101a on the free end side. As a result, the scanning line on the scanning target surface such as the photoconductor 40 bends into a bow shape.

It is to be noted that, even if a static friction generated between the positioning face 105b and the positioning projection 103b on the motor side is identical to the static friction generated between the positioning face 105a of the unit positioning base 101a and the positioning projection 103a on the free end side, the positioning projection 103b on the motor side is likely to move easily on the positioning face 105b of the unit positioning base 101b on the motor side due to the following reasons. Specifically, when the static friction generated between the positioning face 105b and the positioning projection 103b on the side of the driving motor 121 is large, the long lens unit 110 on the motor side gradually bends. However, since a contact position of the positioning face 105b and the positioning projection 103b on the motor side is located close to the pressing position of the inclination adjusting device 120, even if a pressing amount of the inclination adjusting device 120 is small, the long lens unit 110 warps largely. Consequently, a small pressing amount of the inclination adjusting device 120 can make the resilience of the long lens unit 110 greater than the static friction between the positioning face 105b and the positioning projection 103b on the motor side. As a result, a small pressing amount of the inclination adjusting device 120 can move the positioning projection 103b on the positioning face 105b on the motor side.

By contrast, if the inclination adjusting device 120 does not press the long lens unit 110 on the free end side relatively hard, the resilience generated by the warp of the long lens unit 110 does not exceed the static friction between the positioning face 105a of the unit positioning base 101a and the positioning projection 103a on the free end side. As a result, even if the static friction generated between the positioning face 105b and the positioning projection 103b on the motor side is identical to the static friction generated between the positioning face 105a of the unit positioning base 101a and the positioning projection 103a on the free end side, the positioning projection 103b on the motor side slides on the positioning face 105b of the unit positioning base 101b while the positioning projection 103a on the free end side does not slide on the positioning face 105a of the unit positioning base 101a. It is needless to say that, for example, when the inclination adjusting device 120 presses the long lens unit 110 by a small amount, the positioning projection 103b on the motor side does not slide on the positioning face 105b, and therefore the inclination of the scanning line cannot be adjusted.

As described above, the positioning projection 103a on the free end side does not slide on the positioning face 105a at inclination adjustment, and therefore the scanning line warps in a bow shape. This warp of the bow-shaped scanning line worsens the positional shift, thereby failing to form a good image. In order to address this inconvenience, the degree of the biasing force of the positioning leaf springs 102a and 102b is reduced to lower the static friction between the positioning projection (i.e., the positioning projections 103a and 103b) and the positioning face (i.e., the positioning faces 105a and 105b). Further, similar to a comparative long lens unit, the planar portions 10a and 10b of the long lens unit 10 are inserted by a receiving block to position the long lens unit 110 in the optical axis orientation, so as to prevent static friction at a positioning portion such as the positioning projections 103a and 103b.

However, in the above-described cases, the long lens unit 110 vibrates in the optical axis orientation due to vibration generated during image formation, which is likely to generate a defect image. Further, shock generated in transportation of an optical scanner can move the long lens unit 110 provided in the optical scanner largely. Consequently, it is likely that the positioning target projection 10c of the long lens unit 10 becomes off from the pair of positioning projections 140b.

Further, an increase in rigidity of the long lens unit 10 and the bracket 111 can make the resilience of the long lens unit 110 to be greater than the static friction between the positioning projection 103a and the positioning face 105a by a small bend of the long lens unit 110. However, an increase in rigidity of the long lens unit 110 can be achieved by increasing the size of the long lens 10 and the thickness of the bracket 111, which can increase the entire size of the long lens unit 110 and consequently leads to an increase in size of the image forming apparatus 500. Further, if the increase in size of the image forming apparatus 500 can rise the manufacturing cost of the image forming apparatus 500. In addition, if the rigidity of the long lens 10 is enhanced, the pressing of the bend adjusting screw 131 and the biasing force of the bend adjusting leaf spring 114 prevent the long lens 10 from warping. Therefore, it is likely that the bending of the scanning line. Further, if the thickness of the bracket 111 is increased to enhance the rigidity of the bracket 111, the long lens unit 110 becomes heavier. As the weight of the long lens unit 110 increases, the greater biasing force of the positioning leaf springs 102a and 102b is provided to press the positioning projections 103a and 103b against the positioning faces 105a and 105b. As a result, the static friction between the positioning projection (i.e., the positioning projections 103a and 103b) and the positioning face (i.e., the positioning faces 105a and 105b) increases. Consequently, even if the rigidity of the long lens unit 110 is increased, warp of the long lens unit 110 at inclination adjustment cannot be restricted.

Figure 16A:
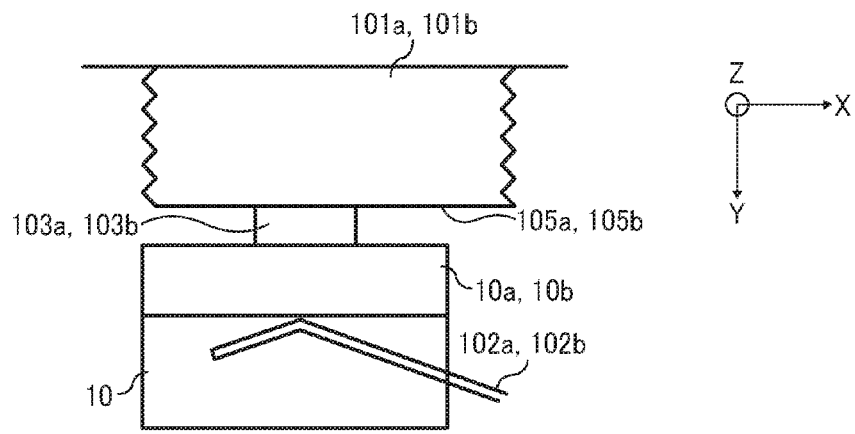
FIG. 16A is a diagram illustrating a configuration in which the positioning face after mirror surface machining.

In order to address this inconvenience, the positioning faces 105a and 105b in the present example have a mirror finished surface having a surface roughness Ra of 1600 nm or less, as illustrated in FIG. 16A. That is, the positioning faces 105a and 105b have the surface roughness Ra greater than a fine glossy surface. By providing the surface roughness Ra of 1600 nm or less to the positioning faces 105a and 105b, the static friction between the positioning projections 103a and 103b and the positioning faces 105a and 105b can be reduced. Therefore, without reducing the pressing force of the positioning projections 103a and 103b to the positioning faces 105a and 105b, the static friction between the positioning projections 103a and 103b and the positioning faces 105a and 105b can be reduced. Consequently, the long lens unit 110 does not vibrate in the optical axis orientation due to vibration generated during image formation, and therefore the long lens unit 110 rotates reliably without bending in the bow shape at inclination adjustment. Further, without increasing the rigidity of the long lens unit 110, the warp of the long lens unit 110 at inclination adjustment of the scanning line can be restricted. It is to be noted that the positioning faces 105a and 105b can be finished to have a glossy surface having a surface roughness of 800 nm or less or a mirror finished surface having a surface roughness of 200 nm or less.

Further, in the configuration illustrated in FIG. 16A, the positioning faces 105a and 105b are machined to have a fine glossy surface having the surface roughness Ra of 1600 nm or less. However, it is also applicable to this disclosure that the leading end faces 109a and 109b of the positioning projections 103a and 103b contacting the positioning faces 105a and 105b, respectively, can have a fine glossy surface having a surface roughness Ra of 1600 nm. Further, it is applicable to this disclosure that both the positioning faces 105a and 105b and the positioning projections 103a and 103b can have a mirror finished surface. In the present example of this disclosure, the optical housing 71 is manufactured by aluminum die-cast, and therefore the mirror surface machining can be performed easily. Accordingly, it is preferable that the positioning faces 105a and 105b provided to the optical housing 71 have mirror surface machining.

Figure 16B:
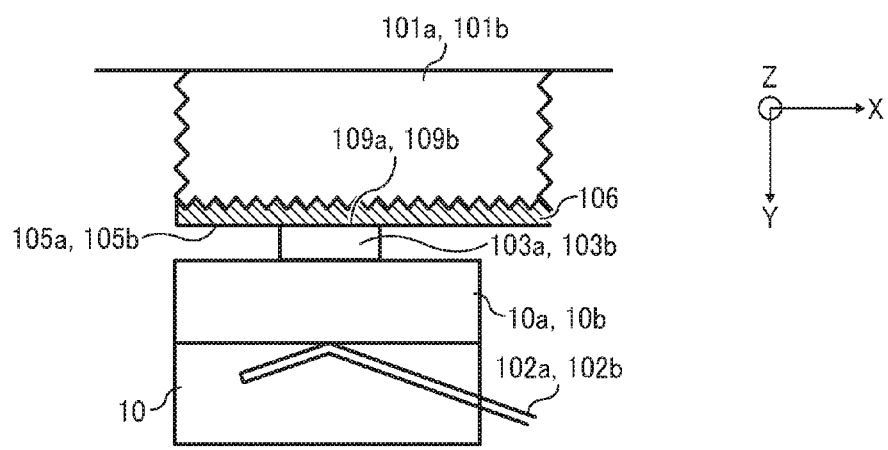
FIG. 16B is a diagram illustrating a configuration in which a unit positioning base provided with a contact end face.

Further, as illustrated in FIG. 16B, a contact end face 106 is provided to the unit positioning bases 101a and 101b formed by the same material as the optical housing 71. The contact end face 106 is formed by a material that has a friction coefficient with the positioning projections 103a and 103b smaller than the unit positioning bases 101a and 101b. With this configuration, the positioning faces 105a and 105b have a smaller friction coefficient to the positioning projections 103a and 103b than the unit positioning bases 101a and 101b, respectively. Therefore, the static friction between the positioning projections 103a and 103b and the positioning faces 105a and 105b can be reduced. Consequently, the positioning projections 103a and 103b smoothly slide on the positioning faces 105a and 105b, respectively, and therefore the long lens unit 110 rotates reliably without bending in the bow shape at inclination adjustment.

Figure 17:
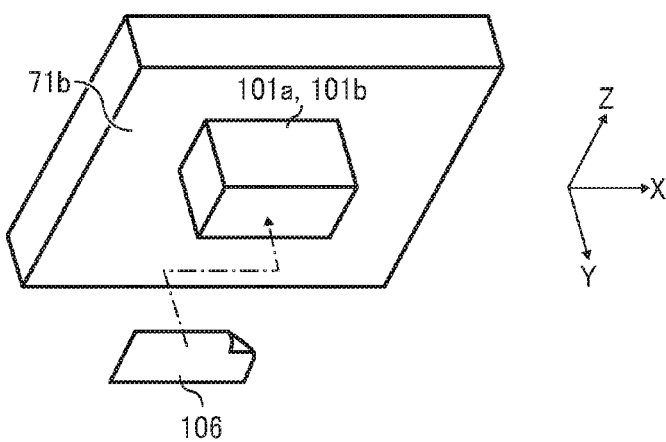
FIG. 17 is a diagram illustrating the unit positioning base to which a low friction film is attached.

As illustrated in FIG. 17, the contact end face 106 can include a low friction film to be attached to the unit positioning bases 101a and 101b by double-sided tape. A material of the low friction film can be fluorocarbon polymers such as polytetrafluoroethylene (PTFE) or ultra-high molecular weight polyethylene. A film made of ultra-high molecular weight polyethylene, which is also referred to as a ultra-high molecular weight polyethylene film, is less expensive than a film made of fluorocarbon polymers, which is also referred to as a fluorocarbon polymer film. Therefore, it is preferable to employ the ultra-high molecular weight polyethylene film to the contact end face 106. As the thickness of the film becomes thinner, the tolerance of thickness of the film becomes smaller. Therefore, a thinner film is more preferable. As described above, when the tolerance of thickness of the film becomes small, a shift of the attitude of the long lens 10 on the motor side and the attitude of the free end side in the optical axis orientation at contact of the positioning projections 103a and 103b to the contact end face 106 can be restrained. Accordingly, the positioning of the long lens unit 110 in the sub-scanning direction (i.e., the X direction in the present example) can be performed reliably. In the present example, a film having a thickness of 0.12 mm is employed to function as the contact end face 106.

Figure 16C:
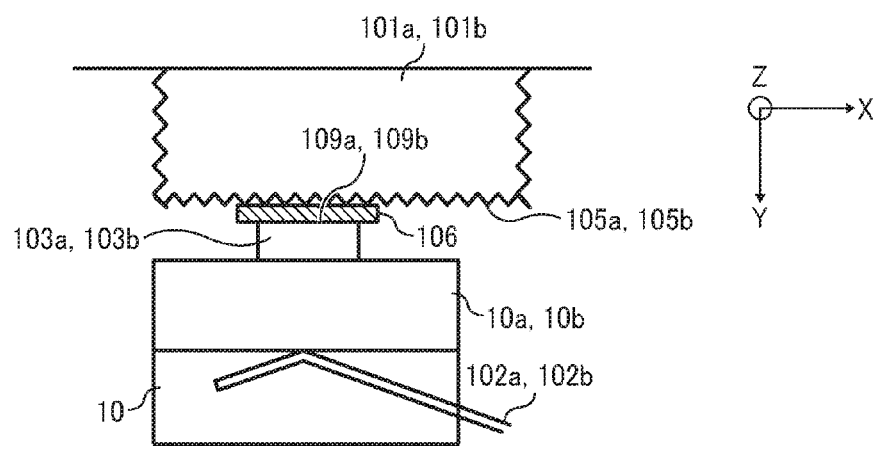
FIG. 16C is a diagram illustrating a configuration in which a positioning projection of the long lens provided with a contact end face.

Further, a surface facing the positioning projection 103a of the unit positioning base 101a and a surface facing the positioning projection 103b of the unit positioning base 101b are applied with fluorocarbon polymers or ultra-high molecular weight polyethylene so as to form the contact end face 106. Further, as illustrated in FIG. 16C, the positioning projections 103a and 103b of the long lens 10 can have the contact end face 106 having a friction coefficient smaller than the positioning projections 103a and 103b.

The static frictions are measured and compared between a case corresponding to the present example in which a ultra-high molecular weight polyethylene film is attached to the unit positioning bases 101a and 101b, as illustrated in FIG. 16B, and a comparative case in which no ultra-high molecular weight polyethylene film is attached to the unit positioning bases 101a and 101b. Specifically, the free end side of the long lens unit 110 was pulled with a spring balance and the force (mass) to start rotating the long lens unit 110 was measured. As a result, the unit positioning bases 101a and 101b to which the ultra-high molecular weight polyethylene film is attached as illustrated in FIG. 16B started to rotate at the force (mass) of 50 g. By contrast, the unit positioning bases 101a and 101b to which no ultra-high molecular weight polyethylene film is attached in the comparative case started to rotate at the force (mass) of 150 g. It is to be noted that the surface roughness Ra of the positioning face of the comparative case was 5000 nm.

In the present example, it is preferable that a warping amount W of a scanning line after inclination adjustment as illustrated in FIG. 15A is 20 µm or less. In the present example, since the force (mass) to start rotating the long lens unit 110 was controlled to 100 g or less, that is, since the static friction was controlled to 0.98N (0.1 kg*9.8 m/s$^2$) or less, the warping amount W was retrained to 20 µm or less. That is, the static friction between the positioning projection 103a and the positioning face 105a and the static friction between the positioning projection 103b and the positioning face 105b are set to be smaller than the resilience of the long lens unit 110 generated when the warping amount W of the scanning line is 20 µm. By so doing, before the warping amount W of the scanning line caused by the bend of the long lens unit 110 reaches 20 µm, the resilience of the long lens unit 110 from the bend thereof becomes equal to or greater than the static friction between the positioning projection 103a and the positioning face 105a and the static friction between the positioning projection 103b and the positioning face 105b, and consequently, the positioning projections 103a and 103b slide on the positioning faces 105a and 105b, respectively. As a result, the warping amount W of the scanning line after inclination adjustment can be restrained to 20 µm or less.

Figure 18A:
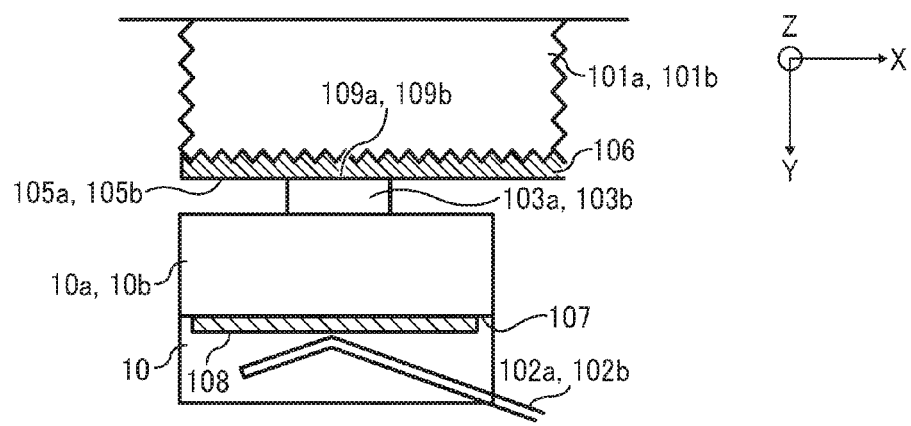
FIG. 18A is a diagram illustrating a configuration in which a pressing target face to which a leaf spring is attached is provided with a contact end face.
Figure 18B:
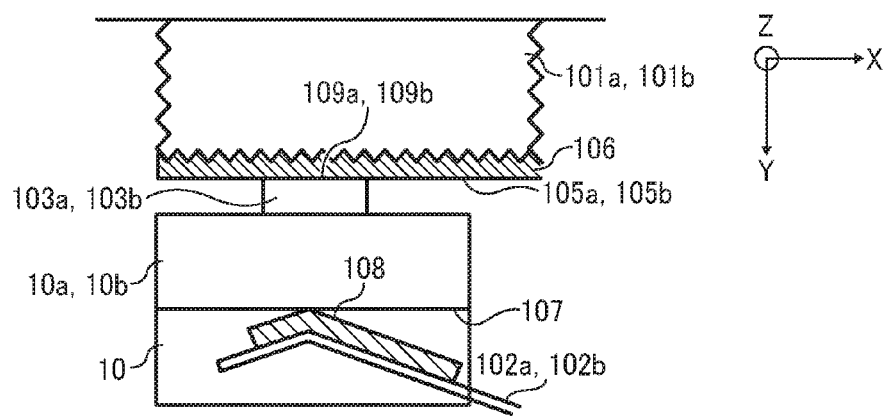
FIG. 18B is a diagram illustrating a configuration in which the leaf spring has a contact end face.

Further, if a static friction generated between the positioning leaf springs 102a and 102b and respective pressed faces of the planar portions 10a and 10b of the long lens 10 to which the positioning leaf springs 102a and 102b contact is large, the pressed faces do not slide on the positioning leaf springs 102a and 102b at inclination adjustment, which can bend the long lens unit 110. As a result, the scanning line after inclination adjustment bends. In order to address this inconvenience, as illustrated in FIG. 18A, a contact end face 108 that has a friction coefficient smaller than the long lens 10 is mounted on a pressed face 107 of the planar portion 10a (10b) to which the positioning leaf spring 102a (102b) contacts. Further, as illustrated in FIG. 18B, the contact end face 108 having a friction coefficient smaller than the positioning leaf springs 102a and 102b can be attached to the positioning leaf springs 102a and 102b. Similar to the contact end face 106m, the contact end face 108 can include a low friction film formed with fluorocarbon polymers such as polytetrafluoroethylene (PTFE) or ultra-high molecular weight polyethylene and attached by double-sided tape. Alternatively, the contact end face 108 can be formed by applying fluorocarbon polymers such as polytetrafluoroethylene (PTFE) or ultra-high molecular weight polyethylene.

By providing the configurations as illustrated in FIGS. 18A and 18B, the static friction between the positioning leaf spring 102 (i.e., the positioning leaf springs 102a and 102b) and the pressed face 107 of the planar portion (i.e., the planar portions 10a and 10b) can be weakened. Consequently, without increasing the rigidity of the long lens unit 110, the warp of the long lens unit 110 at inclination adjustment of the scanning line can be restricted.

Further, the pressed face 107 and each contact face of the positioning leaf springs 102a and 102b can have mirror surface machining so as to reduce the static friction between the pressed face 107 and the contact face of the positioning leaf springs 102a and 102b.

Figure 19A:
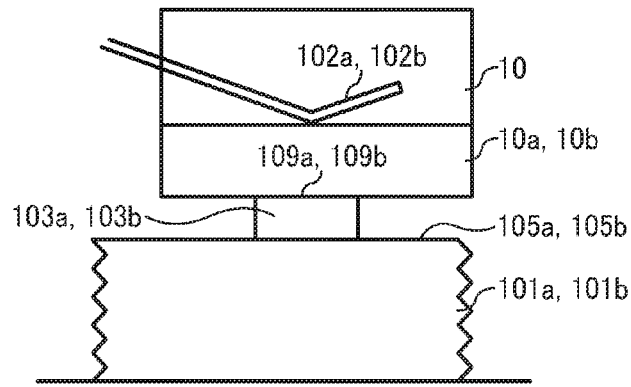
FIG. 19A is a diagram illustrating a configuration in which the unit positioning base is located below the long lens unit and mirror surface machining is performed to a positioning face of the unit positioning base.
Figure 19B:
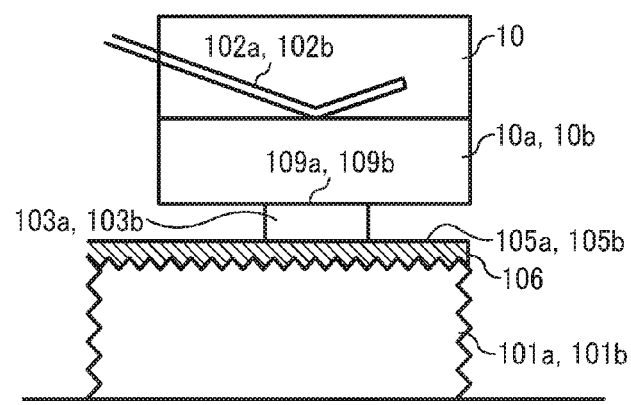
FIG. 19B is a diagram illustrating a configuration in which the unit positioning base is located below the long lens unit and the contact end face having a friction lower than the unit positioning base is provided to the unit poisoning base.
Figure 19C:
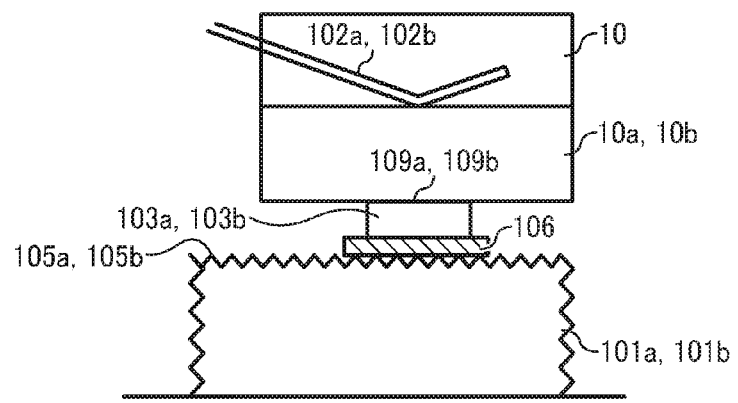
FIG. 19C is a diagram illustrating a configuration in which the unit positioning base is located below the long lens unit and the contact end face having a friction lower than the unit positioning base is provided to the positioning projection.

Further, this disclosure is applicable to configurations as illustrated in FIGS. 19A, 19B, and 19C in which the unit positioning base 101a is located below the long lens unit 110 so as to support the long lens unit 110. In this case, the pressing force of the positioning projection to the positioning face corresponds to the biasing force of the positioning leaf springs 102a and 102b and the weight of the long lens unit 110. Therefore, the biasing force of the positioning leaf springs 102a and 102b to provide a given pressing force can be reduced. However, the pressing force of the positioning projections 103a and 103b to the positioning faces 105a and 105b to control the long lens unit 110 not to vibrate in the optical axis orientation due to vibration generated during image formation remains the same. Therefore, even in the configuration as illustrated in FIGS. 18A and 18B, if the static friction between the positioning projection 103a and the positioning face 105a and the static friction between the positioning projection 103b and the positioning face 105b are large, the long lens unit 110 warps at inclination adjustment of the scanning line. In order to address this inconvenience, the static friction between the positioning projection and the positioning face is reduced in respective configurations illustrated in FIGS. 19A, 19B, and 19C. Specifically, the configuration illustrated in FIG. 19A reduces the static friction of the positioning projection and the positioning face by performing mirror surface machining to the positioning face 105a of the unit positioning base 101a and the positioning face 105b of the unit positioning base 101b. The configuration illustrated in FIG. 19B reduces the static friction of the positioning projection and the positioning face by providing the contact end face having a friction lower than the unit positioning base to the unit positioning base. The configuration illustrated in FIG. 19C reduces the static friction of the positioning projection and the positioning face by providing the contact end face having a friction lower than the positioning projection.

The configurations according to the above-described embodiment are examples. The examples of this disclosure can achieve the following aspects effectively.

Aspect 1.

In Aspect 1, a scanning line adjuster such as the scanning line adjuster 300 includes an optical element such as the long lens unit 10, an attitude changer such as the inclination adjusting device 120, and an optical element positioner such as the unit positioning bases 101a and 101b. The optical element is disposed on an optical path extending from a light source such as the light source 2 to a scanned target object such as the photoconductor 40. The optical element has a positioning portion such as the positioning projections 103a and 103b. The attitude changer changes an attitude of the optical element. The optical element positioner contacts the positioning portion of the optical element and positions the optical element. The optical element positioner contacts the positioning portion of the optical element in a direction perpendicular to a moving direction of the positioning portion of the optical element when the attitude changer changes the attitude of the optical element. A contact face of the positioning portion of the optical element contacts a contact face of the optical element positioner. At least one of the contact face of the positioning portion of the optical element and the contact face of the optical element positioner has a surface roughness Ra equal to or smaller than 1600 nm.

In Aspect 1, as described in the examples above, by providing the surface roughness Ra equal to or smaller than 1600 nm to the at least one of the contact face of the positioning portion of the optical element and the contact face of the optical element positioner, the static friction generated between the positioning portion of the optical element and the optical element positioner can be reduced. Consequently, the positioning portion of the optical element smoothly slides on the optical element positioner at the scanning line adjustment, and therefore the optical element can be prevented from being bent. As a result, the scanning line can be prevented from being bent after adjustment of the attitude of the optical element.

Aspect 2.

In Aspect 2, a scanning line adjuster such as the scanning line adjuster 300 includes an optical element such as the long lens unit 10, an attitude changer such as the inclination adjusting device 120, and an optical element positioner such as the unit positioning bases 101a and 101b. The optical element is disposed on an optical path extending from a light source such as the light source 2 to a scanned target object such as the photoconductor 40. The optical element has a positioning portion such as the positioning projections 103a and 103b. The attitude changer changes an attitude of the optical element. The optical element positioner contacts the positioning portion of the optical element and positions the optical element. The optical element positioner contacts the positioning portion of the optical element in a direction perpendicular to a moving direction of the positioning portion of the optical element when the attitude changer changes the attitude of the optical element. The optical element positioner includes a contact end such as the contact end face 106 to contact the positioning portion. The contact end is made of a different material from a material of the other part of the optical element positioner.

In Aspect 2, as described above in the examples above in reference to FIG. 16B, by providing the contact end made of a different material from the other part of the optical element positioner, the static friction generated between the positioning portion of the optical element and the contact end of the optical element positioner can be reduced in comparison with a configuration in which the contact end of the optical element position is made of the same material as the other part of the optical element positioner. Consequently, the positioning portion of the optical element smoothly slides on the optical element positioner in a direction to which the attitude of the optical element is changed at the scanning line adjustment, and therefore the optical element can be prevented from being bent. As a result, the scanning line can be prevented from being bent after adjustment of the attitude of the optical element.

Aspect 3.

In Aspect 3, a scanning line adjuster such as the scanning line adjuster 300 includes an optical element such as the long lens unit 10, an attitude changer such as the inclination adjusting device 120, and an optical element positioner such as the unit positioning bases 101a and 101b. The optical element is disposed on an optical path extending from a light source such as the light source 2 to a scanned target object such as the photoconductor 40. The optical element has a positioning portion such as the positioning projections 103a and 103b. The attitude changer changes an attitude of the optical element. The optical element positioner contacts the positioning portion of the optical element and positions the optical element. The optical element positioner contacts the positioning portion of the optical element in a direction perpendicular to a moving direction of the positioning portion of the optical element when the attitude changer changes the attitude of the optical element. The positioning portion of the optical element includes a contact end such as the contact end face 106 to contact the optical element positioner. The contact end is made of a different material from a material of the other part of the optical element.

In Aspect 3, as described above in the examples above in reference to FIG. 16C, by providing the contact end made of a different material from the other part of the optical element, the static friction generated between the positioning portion of the optical element and the contact end of the optical element positioner can be reduced in comparison with a configuration in which the contact end of the positioning portion of the optical element is made of the same material as the other part of the optical element. Consequently, the positioning portion of the optical element smoothly slides on the optical element positioner in a direction to which the attitude of the optical element is changed at the scanning line adjustment, and therefore the optical element can be prevented from being bent. As a result, the scanning line can be prevented from being bent after adjustment of the attitude of the optical element.

Aspect 4.

In Aspect 4, a scanning line adjuster such as the scanning line adjuster 300 includes an optical element such as the long lens unit 10, an attitude changer such as the inclination adjusting device 120, an optical element positioner such as the unit positioning bases 101a and 101b, and a pressing unit such as the positioning leaf springs 102a and 102b. The optical element is disposed on an optical path extending from a light source such as the light source 2 to a scanned target object such as the photoconductor 40. The optical element has a positioning portion such as the positioning projections 103a and 103b. The attitude changer changes an attitude of the optical element. The optical element positioner contacts the positioning portion of the optical element and positions the optical element. The optical element positioner contacts the positioning portion of the optical element in a direction perpendicular to a moving direction of the positioning portion of the optical element when the attitude changer changes the attitude of the optical element. The pressing unit presses the positioning portion of the optical element against the optical element positioner. The pressing unit includes a contact end such as the contact end face 108 to contact the positioning portion of the optical element. The contact end is made of a different material from a material of the other part of the pressing unit.

In Aspect 4, as described above in the examples above in reference to FIG. 18B, by providing the contact end made of a different material from the other part of the pressing unit, the static friction generated between the positioning portion of the optical element and the contact end of the pressing unit can be reduced in comparison with a configuration in which the contact end of the pressing unit is made of the same material as the other part of the pressing unit. Consequently, the positioning portion of the optical element smoothly slides on the optical element positioner in a direction to which the attitude of the optical element is changed at the scanning line adjustment, and therefore the optical element can be prevented from being bent. As a result, the scanning line can be prevented from being bent after adjustment of the attitude of the optical element.

Aspect 5.

In Aspect 5, a scanning line adjuster such as the scanning line adjuster 300 includes an optical element such as the long lens unit 10, an attitude changer such as the inclination adjusting device 120, an optical element positioner such as the unit positioning bases 101a and 101b, and a pressing unit such as the positioning leaf springs 102a and 102b. The optical element is disposed on an optical path extending from a light source such as the light source 2 to a scanned target object such as the photoconductor 40. The optical element has a positioning portion such as the positioning projections 103a and 103b. The attitude changer changes an attitude of the optical element. The optical element positioner contacts the positioning portion of the optical element and positions the optical element. The optical element positioner contacts the positioning portion of the optical element in a direction perpendicular to a moving direction of the positioning portion of the optical element when the attitude changer changes the attitude of the optical element. The pressing unit presses the positioning portion of the optical element against the optical element positioner. The positioning portion of the optical element includes a contact end such as the contact end face 108 to contact the pressing unit. The contact end is made of a different material from a material of the other part of the optical element.

In Aspect 5, as described above in the examples above in reference to FIG. 18A, by providing the contact end made of a different material from the other part of the optical element, the static friction generated between the pressing unit and the contact end of the positioning portion of the optical element can be reduced in comparison with a configuration in which the contact end of the positioning portion of the optical element is made of the same material as the other part of the optical element. Consequently, the positioning portion of the optical element smoothly slides on the optical element positioner in a direction to which the attitude of the optical element is changed at the scanning line adjustment, and therefore the optical element can be prevented from being bent. As a result, the scanning line can be prevented from being bent after adjustment of the attitude of the optical element.

Aspect 6.

In any one of Aspects 2 through 5, a frictional coefficient of the contact end of any one unit of the optical element positioner, the positioning portion of the optical element, and the pressing unit is smaller than a frictional coefficient of the other part of the selected unit of the optical element positioner, the positioning portion of the optical element, and the pressing unit.

Accordingly, as described in the examples above, the static friction between the contact end and a contact target can be reduced in comparison with a configuration in which the contact target contacts the selected unit. Consequently, the contact target slides with respect to the contact end relatively smoothly in a direction to which the attitude of the optical element is changed, and therefore the optical element can be prevented from being bent. As a result, the scanning line can be prevented from being bent after adjustment of the attitude of the optical element.

Aspect 7.

In any one of Aspects 2 through 6, the contact end includes ultra-high molecular weight polyethylene.

Accordingly, as described in the examples above, by forming the contact end by ultra-high molecular weight polyethylene having low friction, the static friction between the contact end and a contact target can be reduced reliably. Consequently, the contact target slides with respect to the contact end relatively smoothly in a direction to which the attitude of the optical element is changed, and therefore the optical element can be prevented from being bent. As a result, the scanning line can be prevented from being bent after adjustment of the attitude of the optical element.

Aspect 8.

The optical element such as the long lens unit 110 extends in a main scanning direction and collects light in a sub-scanning direction. The attitude changer presses one longitudinal end of the optical element, rotates the optical element about a center in the main scanning direction of the optical element, and changes the attitude of the optical element.

Accordingly, as described in the examples above, by changing the attitude of the optical element such as the long lens unit 110, the inclination of the scanning line can be corrected.

Aspect 9.

In Aspect 9, an optical scanner such as the writing units 55a and 55b includes a light source such as the light source 2, and the above-described scanning line adjuster such as the scanning line adjuster 300. Accordingly, the scanning line adjuster changes an attitude of the optical element such as the long lens unit 110 disposed on the optical path from the light source to a scanned target object such as the photoconductor 40, and adjusts the scanning line that optically scans the scanned target object.

Consequently, the scanning line on the scanned target object such as the photoconductor 40 can be prevented from occurrence of inclination and bending.

Aspect 10.

In Aspect 10, an image forming apparatus such as the image forming apparatus 500 includes an image bearer such as the photoconductor 40, the above-described optical scanner such as the writing units 55a and 55b, and a developing device such as the developing device 41. The image bearer bears a latent image on a surface thereof. The above-described optical scanner optically forms the latent image on a surface of the image bearer. The developing device develops the latent image formed on the surface of the image bearer into a visible image.

Consequently, a good latent image can be formed and high quality image can be obtained.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A scanning line adjuster comprising:
an optical element disposed on an optical path extending from a light source to a scanned target object, the optical element having a positioning portion;
an attitude changer to change an attitude of the optical element; and
an optical element positioner to position the optical element,
the optical element positioner to contact the positioning portion of the optical element in a direction perpendicular to a moving direction in which the positioning portion of the optical element moves when the attitude changer changes the attitude of the optical element,
the optical element positioner including a contact end to contact the positioning portion,
the contact end made of a different material from a material of the optical element positioner.

2. The scanning line adjuster according to claim 1, wherein a frictional coefficient of the contact end of the optical element positioner is smaller than a frictional coefficient of the optical element positioner other than the contact end.

3. The scanning line adjuster according to claim 1, wherein the contact end of the optical element positioner includes ultra-high molecular weight polyethylene.

4. The scanning line adjuster according to claim 1, wherein the optical element extends in a main scanning direction and collects light in a sub-scanning direction, and
wherein the attitude changer presses one longitudinal end of the optical element, rotates the optical element about a center in the main scanning direction of the optical element, and changes an attitude of the optical element.

5. An optical scanner comprising:
a light source; and
the scanning line adjuster according to claim 1 to change the attitude of the optical element disposed on the optical path from the light source to the scanned target object and adjust a scanning line that optically scans the scanned target object.

6. An image forming apparatus comprising:
an image bearer to bear a latent image;
the optical scanner according to claim 5 to optically form the latent image on a surface of the image bearer; and
a developing device to develop the latent image formed on the surface of the image bearer into a visible image.

7. A scanning line adjuster comprising:
an optical element disposed on an optical path extending from a light source to a scanned target object, the optical element having a positioning portion;
an attitude changer to change an attitude of the optical element; and
an optical element positioner to position the optical element,
the optical element positioner to contact the positioning portion of the optical element in a direction perpendicular to a moving direction in which the positioning portion of the optical element moves when the attitude changer changes the attitude of the optical element,
the positioning portion of the optical element including a contact end to contact the optical element positioner,
the contact end made of a different material from a material of the optical element.

8. The scanning line adjuster according to claim 7, wherein a frictional coefficient of the contact end of the positioning portion of the optical element is smaller than a frictional coefficient of the optical element other than the contact end.

9. The scanning line adjuster according to claim 7, wherein the contact end of the optical element includes ultra-high molecular weight polyethylene.

10. The scanning line adjuster according to claim 7, wherein the optical element extends in a main scanning direction and collects light in a sub-scanning direction, and
wherein the attitude changer presses one longitudinal end of the optical element, rotates the optical element about a center in the main scanning direction of the optical element, and changes an attitude of the optical element.

11. An optical scanner comprising:
a light source; and
the scanning line adjuster according to claim 7 to change an attitude of the optical element disposed on the optical path from the light source to the scanned target object and adjust a scanning line that optically scans the scanned target object.

12. An image forming apparatus comprising:
an image bearer to bear a latent image;
the optical scanner according to claim 11 to optically form the latent image on a surface of the image bearer; and
a developing device to develop the latent image formed on the surface of the image bearer into a visible image.

13. A scanning line adjuster comprising:
an optical element disposed on an optical path extending from a light source to a scanned target object, the optical element having a positioning portion;
an attitude changer to change an attitude of the optical element;
an optical element positioner to position the optical element,
the optical element positioner to contact the positioning portion of the optical element in a direction perpendicular to a moving direction in which the positioning portion of the optical element moves when the attitude changer changes the attitude of the optical element; and a pressing unit to press the positioning portion of the optical element against the optical element positioner, the pressing unit including a contact end to contact the positioning portion of the optical element, the contact end made of a different material from a material of the pressing unit.

14. The scanning line adjuster according to claim 13, wherein a frictional coefficient of the contact end of the pressing unit is smaller than a frictional coefficient of the pressing unit other than the contact end.

15. The scanning line adjuster according to claim 13, wherein the contact end includes ultra-high molecular weight polyethylene.

16. The scanning line adjuster according to claim 13, wherein the optical element extends in a main scanning direction and collects light in a sub-scanning direction, and wherein the attitude changer presses one longitudinal end of the optical element, rotates the optical element about a center in the main scanning direction of the optical element, and changes an attitude of the optical element.

17. An optical scanner comprising:

a light source; and the scanning line adjuster according to claim 13 to change an attitude of the optical element disposed on the optical path from the light source to the scanned target object and adjust a scanning line that optically scans the scanned target object.

18. An image forming apparatus comprising:

an image bearer to bear a latent image;

the optical scanner according to claim 17 to optically form the latent image on a surface of the image bearer; and a developing device to develop the latent image formed on the surface of the image bearer into a visible image.

* * * * *